US012229845B2

United States Patent
Ambrosch et al.

(10) Patent No.: US 12,229,845 B2
(45) Date of Patent: Feb. 18, 2025

(54) SYSTEM AND METHOD FOR PROPERTY GROUP ANALYSIS

(71) Applicant: Cape Analytics, Inc., Palo Alto, CA (US)

(72) Inventors: Philipp Ambrosch, Palo Alto, CA (US); Yirui Jiang, Palo Alto, CA (US); Christopher Wegg, Palo Alto, CA (US)

(73) Assignee: Cape Analytics, Inc., Palo Alto, CA (US)

( * ) Notice: Subject to any disclaimer, the term of this patent is extended or adjusted under 35 U.S.C. 154(b) by 0 days.

(21) Appl. No.: 18/333,803

(22) Filed: Jun. 13, 2023

(65) Prior Publication Data

US 2023/0401660 A1 Dec. 14, 2023

Related U.S. Application Data

(60) Provisional application No. 63/351,720, filed on Jun. 13, 2022.

(51) Int. Cl.
*G06Q 50/16* (2024.01)
*G06V 20/10* (2022.01)

(52) U.S. Cl.
CPC .......... *G06Q 50/16* (2013.01); *G06V 20/176* (2022.01)

(58) Field of Classification Search
None
See application file for complete search history.

(56) References Cited

U.S. PATENT DOCUMENTS

| | | | |
|---|---|---|---|
| 5,633,946 | A | 5/1997 | Lachinski et al. |
| 6,044,171 | A | 3/2000 | Polyakov et al. |
| 6,249,616 | B1 | 6/2001 | Hashimoto |
| 7,327,902 | B2 | 2/2008 | Ritt et al. |
| 7,873,238 | B2 | 1/2011 | Schultz et al. |
| 7,945,117 | B2 | 5/2011 | Hermosillo et al. |
| 8,078,436 | B2 | 12/2011 | Pershing et al. |
| 8,081,841 | B2 | 12/2011 | Schultz et al. |
| 8,145,578 | B2 | 3/2012 | Pershing et al. |
| 8,170,840 | B2 | 5/2012 | Pershing |
| 8,207,964 | B1 | 6/2012 | Meadow et al. |
| 8,209,152 | B2 | 6/2012 | Pershing |

(Continued)

FOREIGN PATENT DOCUMENTS

| | | |
|---|---|---|
| CN | 101549596 B | 8/2012 |
| CN | 105917335 A | 8/2016 |

(Continued)

OTHER PUBLICATIONS

"Cape Analytics Now Detects Yard Debris From Geospatial Imagery", Dec. 18, 2019, https://capeanalytics.com/cape-analytics-now-detects-yard-debris-from-geospatial-imagery/.

(Continued)

*Primary Examiner* — Jan P Mincarelli
(74) *Attorney, Agent, or Firm* — Jeffrey Schox; Diana Lin

(57) ABSTRACT

In variants, a method for property group analysis can include: determining a property, determining whether the property is part of a group, identifying other properties within the group, optionally determining whether to merge groups, and optionally providing a final group. However, the method can additionally and/or alternatively include any other suitable elements.

22 Claims, 13 Drawing Sheets

(56) References Cited

U.S. PATENT DOCUMENTS

| | | | |
|---|---|---|---|
| 8,396,256 B2 | 3/2013 | Lu et al. |
| 8,401,222 B2 | 3/2013 | Thornberry et al. |
| 8,452,125 B2 | 5/2013 | Schultz et al. |
| 8,515,125 B2 | 8/2013 | Thornberry et al. |
| 8,531,472 B2 | 9/2013 | Freund et al. |
| 8,542,880 B2 | 9/2013 | Thornberry et al. |
| 8,548,248 B2 | 10/2013 | Mitchell et al. |
| 8,655,070 B1 | 2/2014 | Yang et al. |
| 8,660,382 B2 | 2/2014 | Schultz et al. |
| 8,670,961 B2 | 3/2014 | Pershing et al. |
| 8,731,234 B1 | 5/2014 | Ciarcia et al. |
| 8,760,285 B2 | 6/2014 | Billman et al. |
| 8,774,525 B2 | 7/2014 | Pershing |
| 8,818,770 B2 | 8/2014 | Pershing |
| 8,823,732 B2 | 9/2014 | Adams et al. |
| 8,825,454 B2 | 9/2014 | Pershing |
| 8,848,983 B1 | 9/2014 | Brewington et al. |
| 8,965,812 B2 | 2/2015 | Linville |
| 8,977,520 B2 | 3/2015 | Stephens et al. |
| 8,995,757 B1 | 3/2015 | Ciarcia et al. |
| 9,117,310 B2 | 8/2015 | Coene et al. |
| 9,129,376 B2 | 9/2015 | Pershing |
| 9,135,737 B2 | 9/2015 | Pershing |
| 9,141,880 B2 | 9/2015 | Ciarcia |
| 9,141,925 B2 | 9/2015 | Jung et al. |
| 9,147,287 B2 | 9/2015 | Ciarcia |
| 9,159,130 B2 | 10/2015 | Kneepkens |
| 9,159,164 B2 | 10/2015 | Ciarcia |
| 9,183,538 B2 | 11/2015 | Thornberry et al. |
| 9,244,589 B2 | 1/2016 | Thornberry et al. |
| 9,275,496 B2 | 3/2016 | Freund et al. |
| 9,292,913 B2 | 3/2016 | Schultz et al. |
| 9,329,749 B2 | 5/2016 | Thornberry et al. |
| 9,389,084 B1 | 7/2016 | Chen et al. |
| 9,437,029 B2 | 9/2016 | Schultz et al. |
| 9,514,568 B2 | 12/2016 | Pershing et al. |
| 9,520,000 B2 | 12/2016 | Freund et al. |
| 9,536,148 B2 | 1/2017 | Gross |
| 9,542,738 B2 | 1/2017 | Schultz et al. |
| 9,576,201 B2 | 2/2017 | Wu et al. |
| 9,599,466 B2 | 3/2017 | Pershing |
| 9,743,046 B2 | 8/2017 | Giuffrida et al. |
| 9,753,950 B2 | 9/2017 | Schultz et al. |
| 9,805,489 B2 | 10/2017 | Schultz et al. |
| 9,836,882 B2 | 12/2017 | Freund et al. |
| 9,911,042 B1 * | 3/2018 | Cardona ........... G06F 18/22 |
| 9,911,228 B2 | 3/2018 | Pershing et al. |
| 9,922,412 B1 | 3/2018 | Freeman et al. |
| 9,933,254 B2 | 4/2018 | Thornberry et al. |
| 9,933,257 B2 | 4/2018 | Pershing |
| 9,959,581 B2 | 5/2018 | Pershing |
| 9,959,653 B2 | 5/2018 | Schultz et al. |
| 9,972,126 B2 | 5/2018 | Freund et al. |
| 10,002,415 B2 | 6/2018 | Shen et al. |
| 10,121,207 B1 | 11/2018 | Devereaux et al. |
| 10,169,680 B1 | 1/2019 | Sachdeva et al. |
| 10,197,391 B2 | 2/2019 | Thornberry et al. |
| 10,229,532 B2 | 3/2019 | Freund et al. |
| 10,311,302 B2 | 6/2019 | Kottenstette et al. |
| 10,338,222 B2 | 7/2019 | Schultz et al. |
| 10,346,935 B2 | 7/2019 | Thornberry et al. |
| 10,402,676 B2 | 9/2019 | Wang et al. |
| 10,430,902 B1 | 10/2019 | Rawat et al. |
| 10,453,147 B1 | 10/2019 | Davis |
| 10,455,197 B2 | 10/2019 | Giuffrida et al. |
| 10,467,476 B1 * | 11/2019 | Cardona ........... G06F 16/9535 |
| 10,489,953 B2 | 11/2019 | Schultz et al. |
| 10,503,843 B2 | 12/2019 | Keane |
| 10,515,414 B2 | 12/2019 | Pershing |
| 10,528,960 B2 | 1/2020 | Pershing et al. |
| 10,529,029 B2 | 1/2020 | Okazaki |
| 10,571,575 B2 | 2/2020 | Schultz et al. |
| 10,573,069 B2 | 2/2020 | Freund et al. |
| 10,648,800 B2 | 5/2020 | Thornberry et al. |
| 10,650,285 B1 | 5/2020 | Okazaki |
| 10,663,294 B2 | 5/2020 | Pershing et al. |
| 10,685,149 B2 | 6/2020 | Pershing |
| 10,796,189 B2 | 10/2020 | Wang et al. |
| 10,839,469 B2 | 11/2020 | Pershing |
| 10,937,178 B1 | 3/2021 | Srinivasan |
| 10,943,464 B1 | 3/2021 | Hayward et al. |
| 11,037,255 B1 | 6/2021 | Ganev et al. |
| 11,210,552 B2 | 12/2021 | Kossyk et al. |
| 11,430,069 B1 | 8/2022 | Pedersen et al. |
| 11,430,076 B1 | 8/2022 | Martin et al. |
| 11,488,255 B1 | 11/2022 | Mast et al. |
| 11,599,706 B1 | 3/2023 | Mark et al. |
| 11,631,235 B2 | 4/2023 | Vianello et al. |
| 11,651,552 B2 | 5/2023 | Valladolid et al. |
| 11,676,298 B1 | 6/2023 | Portail et al. |
| 11,816,747 B1 * | 11/2023 | Buentello ........... G06Q 30/0645 |
| 11,861,843 B2 | 1/2024 | Portail et al. |
| 2003/0146913 A1 | 8/2003 | Shen et al. |
| 2004/0153330 A1 | 8/2004 | Miller et al. |
| 2005/0084178 A1 | 4/2005 | Lure et al. |
| 2005/0154657 A1 | 7/2005 | Kim et al. |
| 2006/0165267 A1 | 7/2006 | Wyman et al. |
| 2008/0133319 A1 | 6/2008 | Adiga et al. |
| 2008/0255862 A1 | 10/2008 | Bailey et al. |
| 2009/0132436 A1 | 5/2009 | Pershing et al. |
| 2010/0014781 A1 | 1/2010 | Liu et al. |
| 2010/0110074 A1 | 5/2010 | Pershing |
| 2010/0111428 A1 | 5/2010 | Yu et al. |
| 2010/0217566 A1 | 8/2010 | Wayne et al. |
| 2010/0296693 A1 | 11/2010 | Thornberry et al. |
| 2012/0005109 A1 | 1/2012 | Stinson |
| 2012/0035887 A1 | 2/2012 | Augenbraun et al. |
| 2012/0120069 A1 | 5/2012 | Kodaira et al. |
| 2012/0141014 A1 | 6/2012 | Lepikhin et al. |
| 2012/0265675 A1 | 10/2012 | Lawrence |
| 2013/0006676 A1 | 1/2013 | Helitzer et al. |
| 2013/0054476 A1 * | 2/2013 | Whelan ............... G06Q 30/02 705/306 |
| 2013/0121571 A1 | 5/2013 | Gokturk et al. |
| 2014/0015924 A1 | 1/2014 | Pryor |
| 2014/0019166 A1 | 1/2014 | Swanson et al. |
| 2014/0139515 A1 | 5/2014 | Kim et al. |
| 2014/0180989 A1 | 6/2014 | Krizhevsky et al. |
| 2014/0270492 A1 | 9/2014 | Christopulos et al. |
| 2015/0029176 A1 | 1/2015 | Baxter et al. |
| 2015/0088886 A1 * | 3/2015 | Brouwer, II ....... G06Q 10/0838 707/737 |
| 2015/0131852 A1 | 5/2015 | Sweetser et al. |
| 2015/0186953 A1 | 7/2015 | Gross |
| 2015/0187015 A1 | 7/2015 | Adams et al. |
| 2015/0228031 A1 | 8/2015 | Emison et al. |
| 2015/0242747 A1 | 8/2015 | Packes et al. |
| 2015/0269598 A1 | 9/2015 | Terrazas et al. |
| 2015/0286786 A1 | 10/2015 | El-Baz et al. |
| 2015/0302529 A1 | 10/2015 | Jagannathan |
| 2015/0347872 A1 | 12/2015 | Taylor et al. |
| 2016/0026900 A1 | 1/2016 | Ando |
| 2016/0027051 A1 * | 1/2016 | Gross ................. G06V 20/20 705/14.54 |
| 2016/0048934 A1 | 2/2016 | Gross |
| 2016/0063516 A1 | 3/2016 | Terrazas et al. |
| 2016/0092959 A1 | 3/2016 | Gross |
| 2016/0162986 A1 | 6/2016 | Ghosh |
| 2016/0292800 A1 | 10/2016 | Smith |
| 2017/0032481 A1 | 2/2017 | Dsouza et al. |
| 2017/0270650 A1 | 9/2017 | Howe et al. |
| 2017/0352099 A1 | 12/2017 | Howe et al. |
| 2017/0357984 A1 | 12/2017 | Takamatsu et al. |
| 2018/0096420 A1 | 4/2018 | Sun et al. |
| 2018/0101917 A1 | 4/2018 | Fujita |
| 2019/0057465 A1 | 2/2019 | Spath |
| 2019/0138665 A1 | 5/2019 | Pershing |
| 2019/0188516 A1 | 6/2019 | Porter et al. |
| 2019/0213412 A1 | 7/2019 | Kottenstette et al. |
| 2019/0213438 A1 | 7/2019 | Jones et al. |
| 2019/0294647 A1 * | 9/2019 | Brouwer ............. G06Q 50/186 |
| 2019/0304026 A1 | 10/2019 | Lyman et al. |
| 2019/0311044 A1 | 10/2019 | Xu et al. |
| 2019/0354772 A1 | 11/2019 | Tasli et al. |

(56) References Cited

U.S. PATENT DOCUMENTS

| | | |
|---|---|---|
| 2020/0034861 A1 | 1/2020 | Lundgren et al. |
| 2020/0082168 A1 | 3/2020 | Fathi et al. |
| 2020/0134733 A1 | 4/2020 | Maddox et al. |
| 2020/0134753 A1 | 4/2020 | Vickers |
| 2020/0151500 A1 | 5/2020 | Kossyk et al. |
| 2020/0160030 A1 | 5/2020 | Lavi |
| 2020/0226373 A1 | 7/2020 | Kottenstette et al. |
| 2020/0279653 A1 | 9/2020 | Hayward |
| 2020/0348132 A1 | 11/2020 | Du et al. |
| 2021/0065340 A1 | 3/2021 | El-Khamy et al. |
| 2021/0089811 A1 | 3/2021 | Strong |
| 2021/0110439 A1 | 4/2021 | Jayne et al. |
| 2021/0118165 A1* | 4/2021 | Strong .................. G06T 7/11 |
| 2021/0124850 A1 | 4/2021 | Messervy et al. |
| 2021/0133891 A1 | 5/2021 | Jagannathan |
| 2021/0133936 A1 | 5/2021 | Chandra et al. |
| 2021/0151195 A1 | 5/2021 | Hayward |
| 2021/0182529 A1* | 6/2021 | Singh .................... G06T 7/33 |
| 2021/0188312 A1 | 6/2021 | Shikari et al. |
| 2021/0199446 A1 | 7/2021 | Marschner et al. |
| 2021/0279852 A1 | 9/2021 | Jakka et al. |
| 2021/0312710 A1 | 10/2021 | Fathi et al. |
| 2022/0012518 A1 | 1/2022 | Sutherland |
| 2022/0012918 A1 | 1/2022 | Kozikowski et al. |
| 2022/0036486 A1 | 2/2022 | Dhandapani et al. |
| 2022/0036537 A1 | 2/2022 | Johnson et al. |
| 2022/0099855 A1 | 3/2022 | Li et al. |
| 2022/0253946 A1 | 8/2022 | Kenney |
| 2022/0292650 A1 | 9/2022 | Amirghodsi et al. |
| 2022/0405856 A1 | 12/2022 | Hedges et al. |
| 2023/0011777 A1 | 1/2023 | Brown et al. |
| 2023/0023808 A1 | 1/2023 | Wall et al. |
| 2023/0119132 A1 | 4/2023 | Cebulski et al. |
| 2023/0230220 A1 | 7/2023 | Portail et al. |
| 2023/0230250 A1 | 7/2023 | Manello |
| 2023/0237775 A1 | 7/2023 | Portail |
| 2023/0385882 A1 | 11/2023 | Lee et al. |

FOREIGN PATENT DOCUMENTS

| | | |
|---|---|---|
| CN | 108197583 A | 6/2018 |
| CN | 108629287 A | 10/2018 |
| EP | 3340106 A1 | 6/2018 |
| EP | 4033426 A1 | 7/2022 |
| WO | 2012115594 A1 | 8/2012 |

OTHER PUBLICATIONS

"CLIP: Connecting Text and Images", https://openai.com/blog/clip/, Jan. 5, 2021.

"gdal_viewshed", © 1998-2022 Frank Warmerdam, Even Rouault, and others, downloaded Aug. 3, 2021, https://gdal.org/programs/gdal_viewshed.html.

"Geospatial Property Analytics: Supercharging AVMs for SFR Investing", Cape Analytics, downloaded Oct. 3, 2022, https://capeanalytics.com/blog/geospatial-property-analytics-avm-sfr-investing/.

"Hail Risk Assessment Hail Risk Score, Hail Damage Score", Verrisk Analytics, downloaded Oct. 15, 2021, https://www.verisk.com/insurance/products/hail-risk-assessment/.

"HOA Lookup City of Goodyear GIS", https://www.arcgis.com/apps/webappviewer/index.html?id=816ddfbd119e49d4a74bb30cb4592c22, first downloaded May 31, 2023.

"Industry-Leading Wildfire Risk Insights", zesty.ai, downloaded Oct. 15, 2021, https://www.zesty.ai/wildfire-risk.

"Manage wildfire risk at the address level", Verisk, downloaded Oct. 15, 2021, https://www.verisk.com/siteassets/media/downloads/underwriting/location/location-fireline.pdf?1=.

"The Real Value of Change Detection: A ChangeFinderTM Story Map", https://www.eagleview.com/newsroom/2018/02/real-value-change-detection/, EagleView US, Feb. 28, 2018.

"Unique Building Identifier (UBID)", Office of Energy Efficiency & Renewable Energy, https://www.energy.gov/eere/buildings/unique-building-identifier-ubid#:~:text=UBID, first downloaded Dec. 22, 2022.

"ValPro+—Cape Analytics", Cape Analytics, https://web.archive.org/web/20210301122341/https://capeanalytics.com/valpro/, downloaded Oct. 3, 2022.

"Weiss Analytics Launches ValPro+, First AVM Powered by Cape Analytics' Instant Property Condition Assessments", Cape Analytics, Feb. 19, 2021, https://capeanalytics.com/resources/weiss-analytics-valpro-instant-property-condition-assessments/.

A, Mark, et al., "An Accuracy Assessment of Various GIS-Based Viewshed Delineation Techniques", 2016.

Ali, Imtiaz, "Unsupervised video analysis for counting of wood in river during floods", Springer-Verlag, 2009, pp. 578-587 (year: 2009).

Ambrosch, Philipp, et al., "System and Method for Property Group Analysis", U.S. Appl. No. 18/333,803, filed Jun. 13, 2023.

Arrowsmith, Ellie, et al., "Wildfire Fuel Management and Risk Mitigation", Insurance Institute for Business & Home Safety, zesty ai, Apr. 2021.

Baranzini, Andrea, et al., "A Sight for Sore Eyes Assessing the value of view and landscape use on the housing market", Publisher:CRAG—Haute école de gestion de Genève, Genève, 2007.

Carlberg, Matthew, et al., "Classifying Urban Landscape in Aerial Lidar Using 3D Shape Analysis", IEEE, 978-1-4244-5654-3, 2009, pp. 1701-1704 (Year: 2009).

Cebulski, Sarah, et al., "System and Method for Property Analysis", U.S. Appl. No. 18/303,990, filed Apr. 20, 2023.

Chen, Yixing, et al., "development of city—modeling", Energy and Buildings, 2019, pp. 252-265 (Year 2019).

Corbin, Matthew, et al., "System and Method for Property Data Management", U.S. Appl. No. 18/104,969, filed Feb. 2, 2023.

Dai, Xieer, et al., "Viewshed Effects and House Prices: Estimating A Spatial Hedonic Model", https://alrov.tau.ac.il/wp-content/uploads/2021/08/%D7%93%D7%A0%D7%99%D7%90%D7%9C-%D7%A4%D7%9C%D7%96%D7%A0%D7%A9%D7%98%D7%99%D7%99%D7%9F-2019.pdf, downloaded Aug. 3, 2021.

Eigen, David, et al., "Depth Map Prediction from a Single Image using a Multi-Scale Deep Network", Proceedings of Advances in Neural Information Processing Systems (NIPS), Jun. 2014.

Ermolin, S. V., et al., "Predicting Days-on-Market for Residential Real Estate Sales", (Year: 2016).

Friedland, Carol, et al., "Integrated Aerial-Based and ground Based-Scales", ResearchGate, Feb. 9, 2015, pp. 1-7 (Year: 2015).

Hamaguchi, Ryuhei, et al., "Rare Event Detection using Disentangled Representation Learning", arXiv:1812.01285, submitted Dec. 4, 2018, 2019 IEEE/CVF Conference on Computer Vision and Pattern Recognition (CVPR) Long Beach, CA, USA, Jun. 15-20, 2019.

Jiang, Shasha, et al., "Automatic urban debris zone extraction from post-hurricane very high-resolution satellite and aerial imagery", Geomatics, Natural hazards and Risk, 2016, pp. 933-952 (Year: 2016).

Johnson, et al., "Valuing curb appeal", The Journal of Real Estate Finance and Economics 60 (2020): 111-133. (Year: 2020).

Kalinicheva, Ekaterina, et al., "Unsupervised Change Detection Analysis in Satellite Image Time Series using Deep Learning Combined with Graph-Based Approaches", https://hal.archives-ouvertes.fr/hal-02749683, Jun. 3, 2020.

Kamara, Amadu Fullah, et al., "A hybrid neural network for predicting Days on Market a measure of liquidity in real estate industry", ScienceDirect, Knowledge-Based Systems, 208 (2020) 106417.

Kotova, Nadia, et al., "Liquidity in Residential Real Estate Markets", Apr. 2021, https://anthonyleezhang.github.io/pdfs/sfipd.pdf.

Lee, Jun-Tae, et al., "Image Aesthetic Assessment Based on Pairwise Comparison—A Unified Approach to Score Regression, Binary Classification, and Personalization", 2019 IEEE/CVF International Conference on Computer Vision (ICCV), Oct. 27, 2019-Nov. 2, 2019.

(56) References Cited

OTHER PUBLICATIONS

Liu, et al., "Learning multi-instance deep ranking and regression network for visual house appraisal", IEEE Transactions on Knowledge and Data Engineering 30.8 (2018): 1496-1506. (Year: 2018).
Maire, Frederic, et al., "A Convolutional Neural Network for Automatic Analysis of Aerial Imagery", 2014 International Conference on Digital Image Computing: Techniques and Applications (DICTA), 8 pages (2014).
Mansouri, Babak, "Earthquake building damage detection using VHR Satellite data", Case study; Two villages near Sarpol-e Zahab), JSEE, Jul. 29, 2018, pp. 45-55 (Year: 2018).
Moussa, A., et al., "Man-made objects classification from satellite/ aerial imagery using neural networks", International Archives of the Photogrammetry, Remote Sensing and Spatial Information Sciences—ISPRS Archives, 4 pages (2010).
Muhs, Sebastian, "Automatic delineation—maps", ELSEVIER, 2016, p. 71-84 (Year: 2016).
Neptune, Nathalie, et al., "Automatic Annotation of Change Detection Images", Sensors, published Feb. 5, 2021.
Plank, Simon, "Rapid damage—Sentinel", Remote Sensing, May 28, 2014, pp. 4870-4906 (Year 2014).
Poursaeed, Omid, et al., "Vision-based Real Estate Price Estimation", arXiv:1707.05489 [cs.CV], https://doi.org/10.48550/arXiv. 1707.05489, Machine Vision and Applications, 29(4), 667-676, 2018.
Radford, Alec, et al., "Learning Transferable Visual Models From Natural Language Supervision", arXiv:2103.00020v1 [cs.CV] Feb. 26, 2021.
Tran, Kieu, "Applying Segmentation and Neural Networks to Detect and Quantify Marine Debris From Aerial w Images Captured by an Unmanned Aerial System and Mobile Device", Aug. 2018, pp. 1-70 (Year 2018).
Urbis, Arvydas, et al., "GIS-Based Aesthetic Appraisal of Short-Range Viewsheds of Coastal Dune and Forest Landscapes", Forests 2021, 12, 1534. https://doi.org/10.3390/f12111534.
Van Leer, Kevin, "Responding to the Alarm Bell: Enabling a Better Understanding of Defensible Space and Wildfire Risk for Individual Structures", CAPE Analytics, Apr. 11, 2019, https://capeanalytics. com/resources/responding-to-the-alarm-bell-enabling-a-better-understanding-of-defensible-space-and-wildfire-risk-for-individual-structures/.
Wang, Jianjun, et al., "Generating Viewsheds without Using Sightlines", Photogrammetric Engineering & Remote Sensing, vol. 66 No. 1, Jan. 2000, pp. 87-90.
Wang, Xuenting, et al., "Predicting the Attractiveness of Real-Estate Images by Pairwise Comparison using Deep Learning", 2019 IEEE International Conference on Multimedia & Expo Workshops (ICMEW), Shanghai, China, 2019, pp. 84-89, doi: 10.1109/ICMEW. 2019.0-106.
Yu, Bailang, et al., "Automated derivation—method", Landscape and urban planning, 2020, pp. 210-219 (Year: 2010).
Zheng, Chuanxia, et al., "Pluralistic Image Completion", arXiv:1903. 04227v2. Apr. 5, 2019.
Zhu, Hengshu, et al., "Days on Market: Measuring Liquidity in Real Estate Markets", KDD '16, Aug. 13-17, 2016, San Francisco, CA, USA.
Hedges, Ryan, et al., "System and Method for Environmental Evaluation", U.S. Appl. No. 18/509,640, filed Nov. 15, 2023.
Lee, Xiang, et al., "System and Method for Property Analysis", U.S. Appl. No. 18/303,990, filed Apr. 20, 2023.
Miao, Haotian, et al., "Multimodal Aesthetic Analysis Assisted by Styles through a Multimodal co-Transformer Model", 2021 IEEE 24th International Conference on Computational Science and Engineering (CSE), Shenyang, China, 2021, pp. 43-50, doi: 10.1109/ CSE53436.2021.00016.
Ucan, Nazli Ozge, "Aesthetic Quality Assessment for Real Estate Images Through Deep Learning Methods", Thesis, Middle East Technical University, Dec. 2022.

\* cited by examiner

SYSTEM AND METHOD FOR PROPERTY GROUP ANALYSIS

CROSS-REFERENCE TO RELATED APPLICATIONS

This application claims the benefit of U.S. Provisional Application No. 63/351,720 filed 13 Jun. 2022, which is incorporated in its entirety by this reference.

TECHNICAL FIELD

This invention relates generally to the real estate field, and more specifically to a new and useful system and method for property group analysis.

DETAILED DESCRIPTION

The following description of embodiments of the invention is not intended to limit the invention to these embodiments, but rather to enable any person skilled in the art to make and use this invention.

1. Overview

Figure 1:
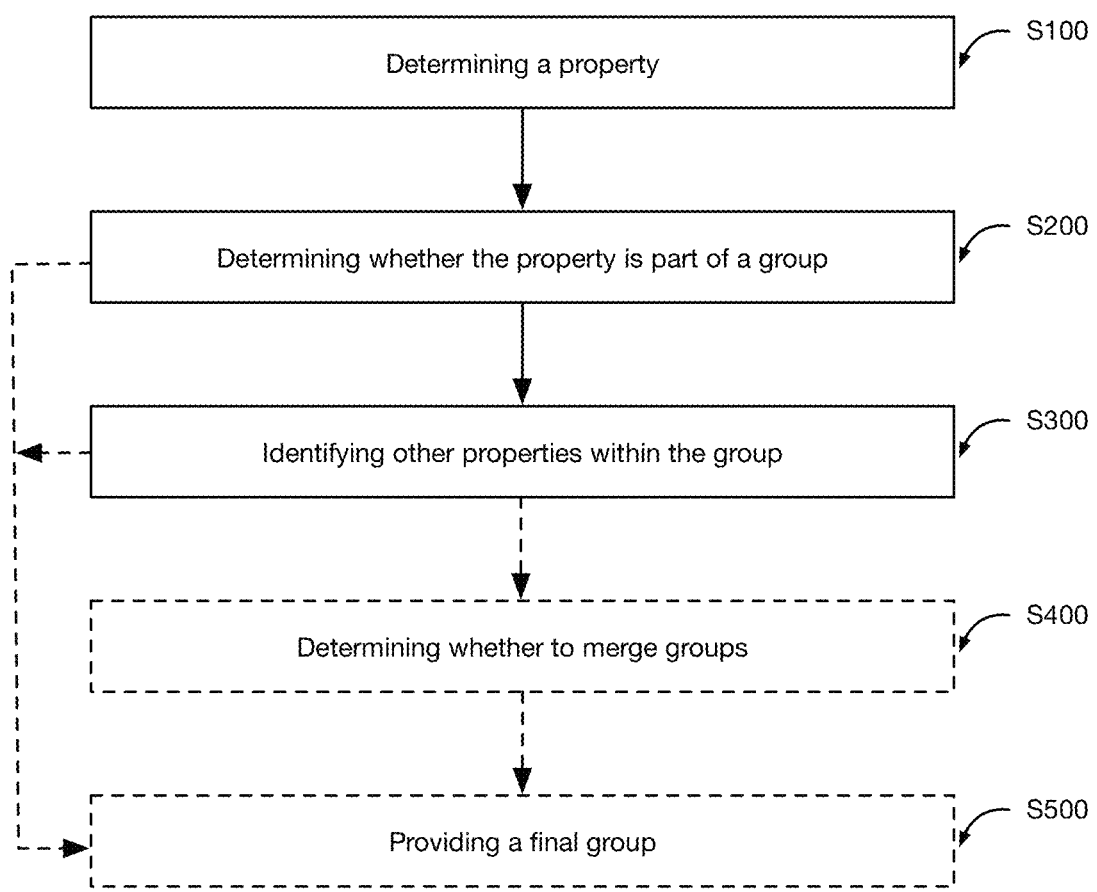
FIG. 1 is a schematic representation of the method.

As shown in FIG. 1, the method for property group analysis can include: determining a property S100, determining whether the property is part of a group S200, identifying other properties within the group S300, optionally determining whether to merge groups S400, and optionally providing a final group S500. However, the method can additionally and/or alternatively include any other suitable elements. One or more variations of the system and/or method can omit one or more of the above elements and/or include a plurality of one or more of the above elements in any suitable order or arrangement.

The method functions to determine a set of properties within a group given a property.

2. Examples

Figure 2:
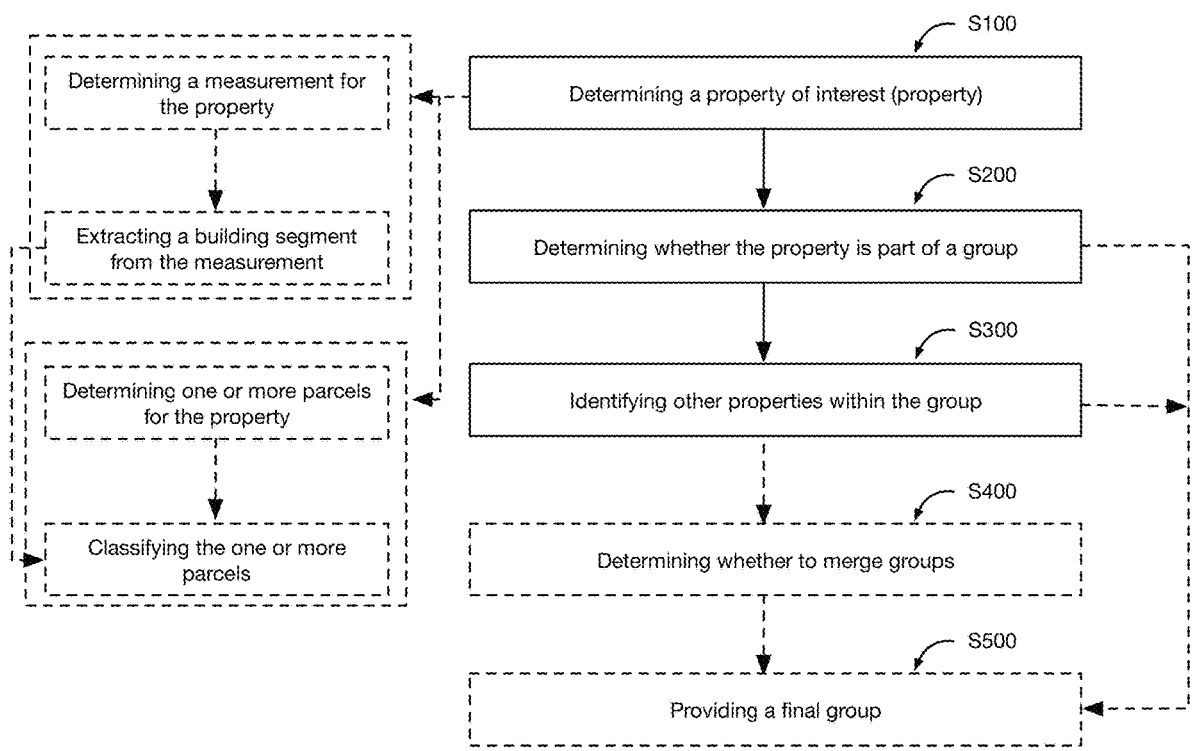
FIG. 2 is an illustrative example of a variant of the method.

In an illustrative example, the method can include: determining a property (e.g., receiving a set of addresses and/or geolocations, one or more properties, etc.); determining a measurement depicting the property (e.g., a set of images depicting the addresses and/or geolocations); and extracting a building segment from the measurement. The method can also include: determining one or more parcels for the property; and optionally classifying the one or more parcels, wherein parcel classes can include: unit parcels (e.g., a parcel that occupies only a partial area of a continuous roof structure), surrounding parcels (e.g., a parcel that has holes, wherein each hole corresponds to a roof structure and/or a smaller parcel), and stand-alone parcels (e.g., a parcel that encloses entire roof structure(s)). The properties within a shared group can then be determined based on the building segments, features extracted therefrom, and/or the parcel classifications (example shown in FIG. 2).

In a first example, all properties associated with smaller parcels that fit within a larger surrounding parcel are considered part of the same group. In a second example, all building segments falling within the holes of a surrounding parcel are considered part of the same group. In a third example, building segments from contiguous or adjacent parcels with similar attribute values (e.g., condition, roof type, etc.) are considered part of the same group. In a fourth example, building segments from contiguous or adjacent parcels with similar feature values (e.g., appearance features extracted from the property measurement(s), geometric features extracted from the property measurement(s), etc.) are considered part of the same group. In a fifth example, parcels can be classified as unit parcels (e.g., when the parcel intersects a building segment extracted from the measurement), wherein the properties for all unit parcels falling within a larger surrounding parcel are considered part of the same group. In a sixth example, when a unit parcel is found, the system can search for other building segments with similar attributes (e.g., appearance, structural values such as shape and size, building-to-parcel ratio, etc.), and associate properties associated with said building segments with the same group. However, the method can leverage a combination of one or more of the aforementioned examples, and/or other methods, to determine the property group.

In variants, the groups can also be merged into super-groups. In a first example, groups that have similar statistical attributes (e.g., average appearance, average structural feature values, etc.) can be merged together into a super-group. In a second example, adjacent groups that have more than a threshold proportion of properties with similar attributes (e.g., similar roof types, similar condition, etc.) and/or features (e.g., appearance features, geometry features, etc.) can be merged. Adjacent groups can be separated by less than a threshold distance, by less than a threshold number of roads, streets, or other thoroughfares, and/or otherwise defined.

However, the properties associated with a shared group can be otherwise determined.

3. Technical Advantages

Variants of the technology for property group analysis can confer several benefits over conventional systems and benefits.

First, determining which properties (e.g., both land and addresses) are part of a shared group, such as a homeowner's association (HOA) or development (for both habitational and non-habitational areas), has historically been extremely difficult, since group records are oftentimes incomplete and/or not publicly accessible, and because individual tracts within the group are oftentimes owned by entities different from the group entity. This can render pure parcel-based analyses to be inaccurate, since parcels that seemingly belong to the same group but are owned by different entities may, in fact, not be owned or associated with the group. Furthermore, in some variants, relying solely on appearance similarities can result in inaccurate group assignments. For example, buildings in development tracts (e.g., Eichler developments, Levittown developments, etc.) oftentimes have similar appearances, but do not belong to a common entity.

Second, variants of the technology can accurately determine which properties are within a shared group by leveraging parcel data (e.g., parcel boundary, parcel position, etc.) and/or imagery depicting the property region. For example, addresses associated with parcels overlapping similar-appearing building segments (e.g., extracted from imagery) can be considered part of the same group. In another example, land associated with a surrounding parcel can be associated with the shared group when constituent parcels and/or building segments of the shared group fit within the holes of the surrounding parcel. However, property assignment to a shared group can be otherwise achieved.

Third, variants of the technology can avoid expensive data collection techniques, such as in-person manual property inspections and/or purchasing expensive datasets. Instead, in variants, determining properties membership within a shared group can be performed using remote imagery (e.g., satellite imagery, aerial imagery, drone imagery, etc.) and/or other remote measurements.

Fourth, variants of the technology can return up-to-date results by using the most recent imagery for every request (e.g., an image collected during a predetermined time or timeframe, collected within the last 3-6 months, collected within the last month, etc.).

Fifth, variants of the technology can increase computational savings and/or decrease computational resources when conducting downstream analyses (e.g., risk analysis, hazard risk estimation, change detection, typicality analysis, automated group and/or property valuation, viewshed analysis, curb appeal analysis, liquidity analysis, etc.). For example, machine learning models (e.g., an AVM) used to determine downstream analyses only evaluate on properties of the shared group determined by the method. This would eliminate spending computational resources on analyses for properties that are not part of the shared group.

However, the technology can confer any other suitable benefits.

4. System

Figure 13:
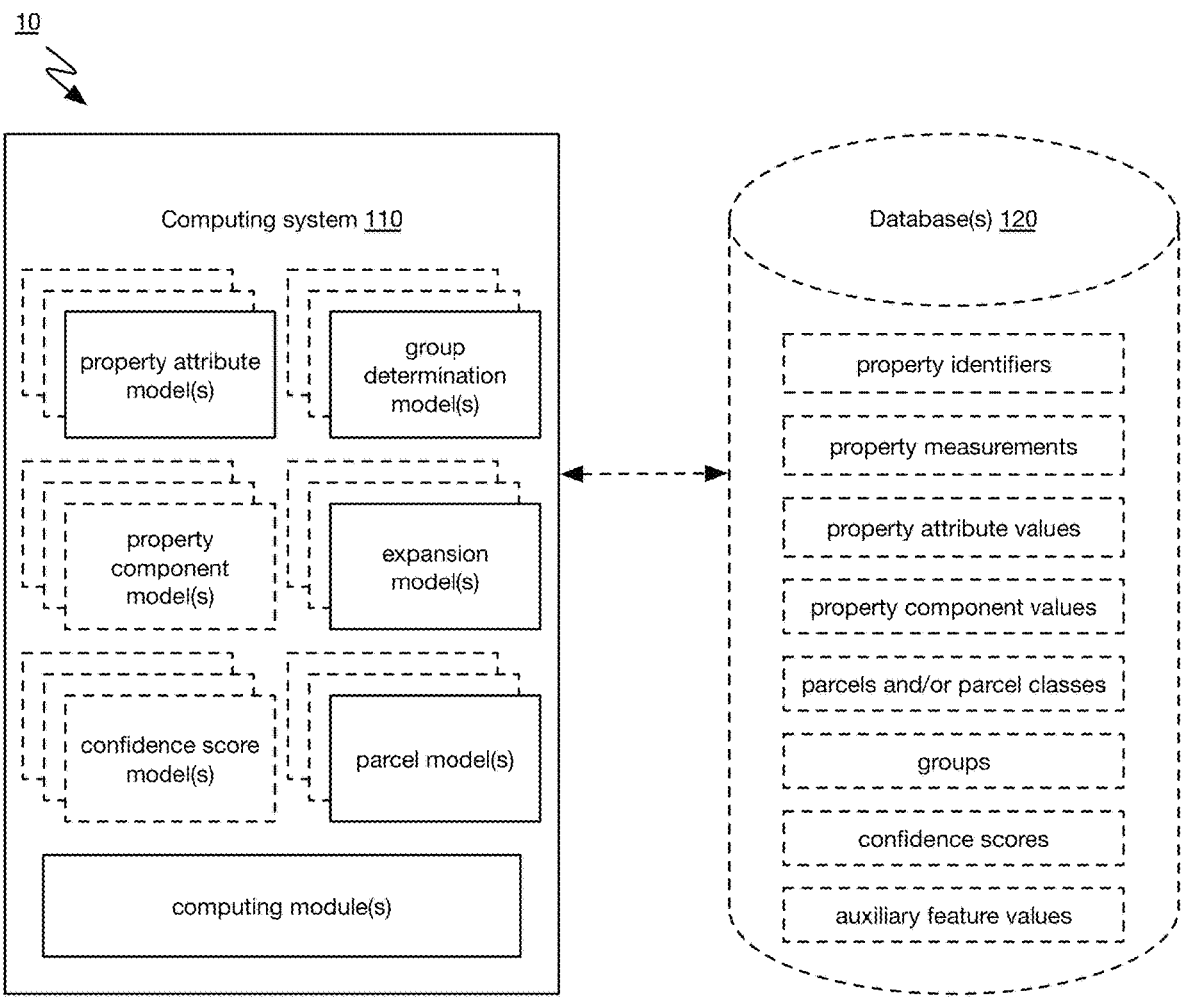
FIG. 13 is a schematic representation of a variant of the system.

The method is preferably performed using a system 10 (example shown in FIG. 13), including: one or more computing systems 110, optionally one or more databases 120, and/or any other suitable components. However, the method can additionally and/or alternatively be performed using any other suitable system. The system 10 can function to facilitate execution of the method. However, the system 10 can provide any other suitable function.

4.1. Properties.

The system 10 and/or method can be used with one or more properties. The properties can function as test properties (e.g., properties of interest), training properties (e.g., used to train the model(s)), and/or be otherwise used.

Each property can be or include: land (e.g., a parcel, geographic region, etc.), a property component or set or segment thereof, and/or otherwise defined. For example, the property can include both the underlying land and improvements (e.g., built structures, fixtures, etc.) affixed to the land, only include the underlying land, or only include a subset of the improvements (e.g., only the primary building). Property components can include: built structures (e.g., primary structure, accessory structure, deck, pool, tennis court, etc.); subcomponents of the built structures (e.g., roof, siding, framing, flooring, living space, bedrooms, bathrooms, garages, parking lots, foundation, HVAC systems, solar panels, slides, diving board, etc.); permanent improvements (e.g., pavement, statutes, fences, etc.); temporary improvements or objects (e.g., trampoline); vegetation (e.g., tree, hedges, flammable vegetation, lawn, etc.); land subregions (e.g., driveway, sidewalk, lawn, backyard, front yard, wildland, etc.); debris; and/or any other suitable component. The property and/or components thereof are preferably physical, but can alternatively be virtual.

Each property can be identified by one or more property identifiers. A property identifier (property ID) can include: geographic coordinates, an address, a parcel identifier, a location identifier (e.g., Google Plus Codes™, Geohashes™, Place Key™, etc.), a block/lot identifier, a planning application identifier, a municipal identifier (e.g., determined based on the ZIP, ZIP+4, city, state, etc.), and/or any other identifier. The property identifier can be used to retrieve property information, such as parcel information (e.g., parcel boundary, parcel location, parcel area, parcel shape, parcel geometry, etc.), property measurements, property descriptions, and/or other property data. The property identifier can additionally or alternatively be used to identify a property component, such as a primary building or secondary building, and/or be otherwise used.

4.2. Property Information.

Each property can be associated with property information. The property information can be extracted from another piece of property information, retrieved from a third-party, received from a user, and/or be otherwise obtained. The property information can be static (e.g., remain constant over a threshold period of time) or variable (e.g., vary over time). The property information can be associated with: a time (e.g., a generation time, a valid duration, etc.), a source (e.g., the information source), an accuracy or error, and/or any other suitable metadata. The property information is preferably specific to the property, but can additionally or alternatively be from other properties (e.g., neighboring properties, other properties sharing one or more attributes with the property). Examples of property information can include: measurements, descriptions, attributes, auxiliary data, and/or any other suitable information about the property.

Property measurements preferably measure an aspect about the property, such as a visual appearance, geometry, and/or other aspect. In variants, the property measurements can depict a property (e.g., the property of interest), but can additionally or alternatively depict the surrounding geographic region, adjacent properties, and/or other factors. The measurement can be: 2D, 3D, and/or have any other set of dimensions. Examples of measurements can include: images, surface models (e.g., digital surface models (DSM), digital elevation models (DEM), digital terrain models (DTM), etc.), point clouds (e.g., generated from LIDAR, RADAR, stereoscopic imagery, etc.), depth maps, depth images, virtual models (e.g., geometric models, mesh models), audio, video, radar measurements, ultrasound measurements, and/or any other suitable measurement. Examples of images that can be used include: RGB images, hyperspectral images, multispectral images, black and white images, grayscale images, panchromatic images, IR images, NIR images, UV images, thermal images, and/or images sampled using any other set of wavelengths; images with depth values associated with one or more pixels (e.g., DSM, DEM, etc.); and/or any other suitable images.

The measurements can include: remote measurements (e.g., geospatial imagery, aerial imagery, satellite imagery, balloon imagery, drone imagery, etc.), local or on-site measurements (e.g., sampled by a user, streetside measurements, etc.), and/or sampled at any other proximity to the property. The remote measurements can be measurements sampled more than a threshold distance away from the property, such as more than 100 ft, 500 ft, 1,000 ft, any range therein, and/or sampled any other distance away from the property. The measurements can be: top-down measurements (e.g., nadir measurements, panoptic measurements, etc.), side measurements (e.g., elevation views, street measurements, etc.), angled and/or oblique measurements (e.g., at an angle to vertical, orthographic measurements, isometric views, etc.), and/or sampled from any other pose or angle relative to the property. The measurements can depict the property exterior, the property interior, and/or any other view of the property.

The measurements can be a full-frame measurement, a segment of the measurement (e.g., the segment depicting the property, such as that depicting the property's parcel; the segment depicting a geographic region a predetermined distance away from the property; etc.), a merged measurement (e.g., a mosaic of multiple measurements), orthorectified, and/or otherwise processed.

The measurements can be received as part of a user request, retrieved from a database 120, determined using other data (e.g., segmented from an image, generated from a set of images, etc.), synthetically determined, and/or otherwise determined.

The property information can include property descriptions. The property description can be: a written description (e.g., a text description), an audio description, and/or in any other suitable format. The property description is preferably verbal but can alternatively be nonverbal. The property description can be text-based, image-based, 3D-model based, and/or be otherwise represented. Examples of property descriptions can include: listing descriptions (e.g., from a realtor, listing agent, etc.), property disclosures, inspection reports, permit data, appraisal reports, and/or any other description of a property.

The property information can include auxiliary data. Examples of auxiliary data can include property descriptions, permit data, insurance loss data, inspection data, appraisal data, broker price opinion data, property valuations, property attribute and/or component data (e.g., values), and/or any other suitable data.

However, the property information can include any other suitable information about the property.

One or more property features can be extracted from the property information (and/or a set thereof). A feature can represent aspects of the information itself (e.g., aspects of the measurement). Features can be independent (e.g., do not carry information about and/or are not dependent on the values of other features) or dependent (e.g., determined based on another feature, dependent upon another feature, etc.). Examples of features that can be determined include: geometric features (e.g., aspects of a geometric measurement), appearance-based features (e.g., aspects of an image or appearance measurement), interaction-based features (e.g., how geometries interact with each other, how attributes interact with each other, etc.), and/or other features. Examples of features that can be extracted can include: color components, length, area, circularity, gradient magnitude, gradient direction, points, edges, measurement unit intensity values, convexity gain (e.g., whether the total convexity of two combined geometries is higher than the convexities of the geometries alone), and/or other features. Features can be determined using: image processing, point cloud processing, machine learning techniques (ex., extracted using an encoder, extracted by a neural network or an intermediate layer thereof, etc.), SIFT, using a Gaussian, edge detection, corner detection, blob detection, ridge detection, edge direction, changing intensity, autocorrelation, thresholding, blob extraction, template matching, Hough transform, etc.), and/or any other suitable set of methodologies.

4.3. Property Attributes.

Each property can be associated with a set of property attributes, which can function to represent one or more aspects of a given property. Attributes can be independent (e.g., do not carry information about and/or are not dependent on the values of other attributes) or dependent (e.g., determined based on another attribute, dependent upon another attribute, etc.). The property attributes can be semantic, quantitative, qualitative, and/or otherwise describe the property. Each property can be associated with its own set of property attributes, and/or share property attributes with other properties. As used herein, property attributes can refer to the attribute parameter (e.g., the variable) and/or the attribute value (e.g., value bound to the variable for the property).

Property attributes can include: property components, features (e.g., feature vector, mesh, mask, point cloud, pixels, voxels, any other parameter extracted from a measurement), any parameter associated with a property component (e.g., property component characteristics), semantic features (e.g., whether a semantic concept appears within the property information), and/or higher-level summary data extracted from property components and/or features. Property attributes can be determined based on property information for the property itself, neighboring properties, and/or any other set of properties. Property attributes can be determined based on: measurements, features, other property information, and/or any other suitable data. Property attributes can be automatically determined (e.g., by a model), manually determined (e.g., by an inspector, by a real estate appraiser, etc.), and/or otherwise determined.

Property attributes can include: structural attributes, condition attributes, record attributes, semantic attributes, subjective attributes, neighborhood attributes, market attributes, and/or any other suitable set of attributes.

Other property attributes can include: built structure values (e.g., roof slope, roof rating, roof material, root footprint, covering material, etc.), auxiliary structures (e.g., a pool, a tennis court, a statue, ADU, etc.), risk asset scores (e.g., asset score indicating risk of flooding, hail, wildfire, wind, house fire, etc.), neighboring property values (e.g., distance of neighbor, structure density, structure count, etc.), and/or any other suitable attributes.

Example property attributes can include: structural attributes (e.g., for a primary structure, accessory structure, neighboring structure, etc.), record attributes (e.g., number of bed/bath, construction year, square footage, legal class, legal subclass, geographic location, etc.), condition attributes (e.g., yard condition, roof condition, pool condition, tennis court condition, paved surface condition, etc.), semantic attributes (e.g., semantic descriptors), location (e.g., parcel centroid, structure centroid, roof centroid, etc.), property type (e.g., single family, lease, vacant land, multi-family, duplex, etc.), property component parameters (e.g., area, enclosure, presence, structure type, count, material, construction type, area condition, spacing, relative and/or global location, distance to another component or other reference point, density, geometric parameters, condition, complexity, etc.; for pools, porches, decks, patios, fencing, etc.), storage (e.g., presence of a garage, carport, etc.), permanent or semi-permanent improvements (e.g., solar panel presence, count, type, arrangement, and/or other solar panel parameters; HVAC presence, count, footprint, type, location, and/or other parameters; etc.), temporary improvement parameters (e.g., presence, area, location, etc. of trampolines, playsets, etc.), pavement parameters (e.g., paved area, percent illuminated, paved surface condition, etc.), foundation elevation, terrain parameters (e.g., parcel slope, surrounding terrain information, etc.), legal class (e.g., residential, mixed-use, commercial), legal subclass (e.g., single-family vs. multi-family, apartment vs. condominium), geographic location (e.g., neighborhood, zip, etc.), population class (e.g., suburban, urban, rural, etc.), school district, orientation (e.g., side of street, cardinal direction, etc.), subjective attributes (e.g., curb appeal, viewshed, etc.), built structure values (e.g., roof slope, roof rating, roof material, roof footprint, covering material, number of roof facets, etc.), auxiliary structures (e.g., a pool, a tennis court, a statue, ADU, etc.), risk scores (e.g., score indicating risk of flooding, hail, fire, wind, wildfire, etc.), neighboring property values (e.g., distance to neighbor, structure density, structure count, etc.), context (e.g., hazard context, geographic context, vegetation context, weather context, terrain context, etc.), historical construction information, historical transaction information (e.g., list price, sale price, spread, transaction frequency, transaction trends, etc.), semantic information, and/or any other attribute that remains substantially static after built structure construction.

In variants, the set of attributes that are used (e.g., by the model(s)) can be selected from a superset of candidate attributes. This can function to: reduce computational time and/or load (e.g., by reducing the number of attributes that need to be extracted and/or processed), increase score prediction accuracy (e.g., by reducing or eliminating confounding attributes), and/or be otherwise used. The set of attributes can be selected: manually, automatically, randomly, recursively, using an attribute selection model, using lift analysis (e.g., based on an attribute's lift), using any explainability and/or interpretability method, based on an attribute's correlation with a given metric or training label, using predictor variable analysis, through predicted outcome validation, during model training (e.g., attributes with weights above a threshold value are selected), using a deep learning model, based on a zone classification, and/or via any other selection method or combination of methods.

Attribute values can be discrete, continuous, binary, multiclass, and/or otherwise structured. The attribute values can be associated with time data (e.g., from the underlying measurement timestamp, value determination timestamp, etc.), a hazard event, an uncertainty parameter, and/or any other suitable metadata.

Attribute values can optionally be associated with an uncertainty parameter. Uncertainty parameters can include variance values, a confidence score, and/or any other uncertainty metric. In a first illustrative example, the attribute value model classifies the roof material for a structure as: shingle with 90% confidence, tile with 7% confidence, metal with 2% confidence, and other with 1% confidence. In a second illustrative example, 10% of the roof is obscured (e.g., by a tree), which can result in a 90% confidence interval for the roof geometry attribute value. In a third illustrative example, the vegetation coverage attribute value is 70%±10%. In a fourth illustrative example, attributes can be characterized with a quantile distribution of attribute values (e.g., wherein the uncertainty parameter for each attribute value is determined based on the quantile that the value falls within or a probability of the quantile distribution).

The attributes can be determined from property information (e.g., property measurements, property descriptions, etc.), a database 120 or a third party source (e.g., third-party database, MLS™ database, city permitting database, historical weather and/or hazard database, tax assessor database, etc.), be predetermined, be calculated (e.g., from an extracted value and a scaling factor, etc.), and/or be otherwise determined. In a first example, the attributes can be determined by extracting features from property measurements, wherein the attribute values can be determined based on the extracted feature values. In a second example, a trained attribute model can predict the attribute value directly from property information (e.g., based on property imagery, descriptions, etc.). In a third example, the attributes can be determined by extracting features from a property description (e.g., using a sentiment extractor, keyword extractor, etc.). However, the attributes can be otherwise determined. In examples, property attributes and/or values thereof can defined and/or determined as disclosed in U.S. application Ser. No. 18/092,689 filed 3 Jan. 2023, U.S. application Ser. No. 17/526,769 filed 15 Nov. 2021, U.S. application Ser. No. 17/546,620 filed 9 Dec. 2021, U.S. application Ser. No. 17/529,836 filed 18 Nov. 2021, U.S. application Ser. No. 17/749,385 filed 20 May 2022, U.S. application Ser. No. 18/121,114 filed 14 Mar. 2023, U.S. application Ser. No. 17/858,422 filed 6 Jul. 2022, U.S. application Ser. No. 17/981,903 filed 7 Nov. 2022, U.S. application Ser. No. 17/968,662 filed 18 Oct. 2022, U.S. application Ser. No. 17/841,981 filed 16 Jun. 2022, U.S. application Ser. No. 18/141,033 filed 28 Apr. 2023, U.S. application Ser. No. 18/098,841 filed 19 Jan. 2023, and/or U.S. application Ser. No. 18/100,736 filed 24 Jan. 2023, each of which is incorporated in its entirety by this reference (e.g., wherein features and/or feature values disclosed in the references can correspond to attributes and/or attribute values).

Property attributes and/or attribute values are preferably determined contemporaneously with method execution, asynchronously from method execution, in real time or near real time (NRT) with respect to the method, and/or with any other suitable frequency and/or timing. Attributes and values can be stored by the processing system performing the determination of property attributes, and/or by any other suitable system. Preferably, storage can be temporary, based on time (e.g., 1 day, 1 month, etc.), based on use (e.g., after one use of the property attribute values by the asset prediction model), based on time and use (e.g., after one week without use of property attribute values), and/or based on any other considerations. Alternatively, property asset data is permanently stored.

However, any other suitable property attribute and/or value thereof can be determined.

4.4. Models.

The system can be used with one or more models. The models can be or include: neural networks (e.g., CNN, DNN, CV model, etc.), an equation (e.g., weighted equations), regression (e.g., leverage regression), a curve, foundation models (e.g., GPT-3, BERT, DALL-E 2, SAM, etc.), classification (e.g., binary classifiers, multiclass classifiers, semantic segmentation models, instance-based segmentation models, etc.), segmentation algorithms (e.g., neural networks, such as CNN based algorithms, thresholding algorithms, clustering algorithms, etc.), rules, heuristics (e.g., inferring the number of stories of a property based on the height of a property), instance-based methods (e.g., nearest neighbor), regularization methods (e.g., ridge regression), decision trees, Bayesian methods (e.g., Naïve Bayes, Markov, etc.), kernel methods, statistical methods (e.g., probability), deterministics, support vectors, genetic programs, isolation forests, robust random cut forest, clustering, selection and/or retrieval (e.g., from a database 120 and/or library), comparison models (e.g., vector comparison, image comparison, etc.), object detectors (e.g., CNN based algorithms, such as Region-CNN, fast RCNN, faster R-CNN, YOLO, SSD-Single Shot MultiBox Detector, R-FCN, etc.), feed forward networks, transformer networks, generative algorithms (e.g., diffusion models, GANs, etc.), and/or other neural network algorithms, key point extraction, SIFT, any computer vision and/or machine learning method (e.g., CV/ML extraction methods), and/or any other suitable model or methodology. The models can include (e.g., be constructed using) a set of input layers, output layers, and hidden layers (e.g., connected in series, such as in a feed forward network; connected with a feedback loop between the output and the input, such as in a recurrent neural network; etc.; wherein the layer weights can be learned through training); a set of fully or partially connected convolution layers (e.g., in a CNN); a set of self-attention layers; and/or have any other suitable architecture.

The models can be trained (e.g. pre-trained) using: self-supervised learning, semi-supervised learning, supervised learning, unsupervised learning, reinforcement learning, transfer learning, Bayesian optimization, positive-unlabeled learning, using backpropagation methods (e.g., by propagating a loss calculated based on a comparison between the predicted and actual training target back to the model; by updating the architecture and/or weights of the model based on the loss; etc.), and/or otherwise learned. The model can be learned or trained on: labeled data (e.g., data labeled with the target label), unlabeled data, positive training sets (e.g., a set of data with true positive labels), negative training sets (e.g., a set of data with true negative labels), and/or any other suitable set of data.

The method can optionally include determining interpretability and/or explainability of the trained model, wherein the identified attributes (and/or values thereof) can be provided to a user, used to identify errors in the data, used to identify ways of improving the model, and/or otherwise used. Interpretability and/or explainability methods can include: local interpretable model-agnostic explanations (LIME), Shapley Additive explanations (SHAP), Ancors, DeepLift, Layer-Wise Relevance Propagation, contrastive explanations method (CEM), counterfactual explanation, Protodash, Permutation importance (PIMP), L2X, partial dependence plots (PDPs), individual conditional expectation (ICE) plots, accumulated local effect (ALE) plots, Local Interpretable Visual Explanations (LIVE), breakDown, ProfWeight, Supersparse Linear Integer Models (SLIM), generalized additive models with pairwise interactions (GA2Ms), Boolean Rule Column Generation, Generalized Linear Rule Models, Teaching Explanations for Decisions (TED), and/or any other suitable method and/or approach.

All or a portion of the models discussed above can be debiased (e.g., to protect disadvantaged demographic segments against social bias, to ensure fair allocation of resources, etc.), such as by adjusting the training data, adjusting the model itself, adjusting the training methods, and/or otherwise debiased. Methods used to debias the training data and/or model can include: disparate impact testing, data pre-processing techniques (e.g., suppression, massaging the dataset, apply different weights to instances of the dataset), adversarial debiasing, Reject Option based Classification (ROC), Discrimination-Aware Ensemble (DAE), temporal modelling, continuous measurement, converging to an optimal fair allocation, feedback loops, strategic manipulation, regulating conditional probability distribution of disadvantaged sensitive attribute values, decreasing the probability of the favored sensitive attribute values, training a different model for every sensitive attribute value, and/or any other suitable method and/or approach.

The system 10 and/or method can include and/or be used with: one or more property attribute models, one or more parcel models, one or more group determination models, one or more expansion models, one or more confidence score models, and/or any other suitable models.

The one or more (property) attribute models can function to determine values for one or more property attributes. The system 10 can include one or more property attribute models for: one or more property attributes, one or more locations, one or more property classes, one or more time intervals, one or more providers, one or more third-parties, one or more modalities, combinations thereof, and/or any other suitable parameters. Each property attribute model can determine values for one or more property attributes, or not determine values for one or more property attributes. Each attribute model can determine values for a single attribute (e.g., be a binary classifier, be a multiclass classifier, etc.), multiple attributes (e.g., be a multiclass classifier), and/or for any other suitable set of attributes. A single attribute value can be determined using a single attribute model, multiple attribute models, and/or any other suitable number of attribute models. Each property attribute model can be specific to contextual parameter values, a property, a property class (e.g., house, physical structure, etc.), a property subclass (e.g., single-family house, multi-family house, etc.) a location (e.g., by street, by town, by city, by state, by country, by zip code, etc.), a location type (e.g., suburban, rural, urban, etc.), a perspective (e.g., exterior, interior, front view, back view, etc.), a metadata value (e.g., modality, provider, etc.), and/or be otherwise specific. Additionally and/or alternatively, the model can be generic across contextual parameter values, properties, property classes, property subclasses, locations, location types, perspectives, and/or be otherwise generic.

Inputs of each property attribute model, used to determine attribute values for a property of interest, can include: property information (examples described above) for the property of interest, property information for associated properties (e.g., neighboring properties to the property of interest, auxiliary properties, etc.), and/or any other suitable set of inputs. The property information can include: measurements (e.g., RGB images, 2D images, 3D images, geometric information, DSM, etc.), descriptions, parcel data, auxiliary data, a property identifier, a geographic identifier, and/or any other suitable information for a property. The property information can be associated with: a single property, a larger geographic context (e.g., based on a region larger than the property parcel size), and/or be otherwise associated with one or more properties. The inputs can optionally be associated: with a common timestamp, with a common timeframe (e.g., all determined within the same week, month, quarter, season, year, etc.), with different timestamps, with different timeframes, and/or be otherwise temporally related. Each property attribute model can predict, extract, and/or otherwise determine property attribute values for a property.

Outputs of each property attribute model can include: values for one or more property attributes, measurements for a property, image feature segments, property identifiers, uncertainty parameters (e.g., a confidence score for each attribute value prediction), and/or any other suitable outputs.

In a first variant, the property attribute model can be a neural network (NN) that extracts the property attribute value from property measurements. The NN can be trained using training property measurements (and/or features extracted therefrom) associated with ground-truth attribute values (e.g., determined by a user, calculated from a ranking, etc.).

In a second variant, the property attribute model can be a model that post-processes components (and/or measurement segments depicting the components) extracted from property measurements. In a first example, the living area footprint can be calculated from the roof footprint. In a second example, a liquidity metric can be determined based on attributes extracted from the image and/or the parcel data. In this variant, the system 10 can additionally and/or alternatively include a property component model (e.g., component detector, segmentation model, etc.) that extracts the property component (e.g., built structure, roof, pool, tennis court, vegetation, etc.) from the property measurements (e.g., extracting a building segment from the property measurement). The property component model preferably ingests one or more property measurements, but can additionally and/or alternatively ingest other property information (e.g., parcel information, other information as described above, etc.), and/or any other suitable input. The property component model can: detect the presence of a property component (e.g., a property component class), determine a bounding box surrounding the property component, determine a property component segment (e.g., masks, pixel labels, etc.), determine property component parameters (e.g., location, orientation, dimensions, etc.), determine a class for the property component, and/or provide any other suitable output. The property component model can be a semantic segmentation model (e.g., label each pixel with a component class label or no component class label), instance-based segmentation model (e.g., distinguish between different instances of the same component class within the measurement), SAM, Viola Jones, Scale-invariant feature transform (SIFT), Histogram of oriented gradients (HOG), region proposals (e.g., R-CNN), Single Shot MultiBox Detector (SSD), You Only Look Once (YOLO), Single-Shot Refinement Neural Network for Object Detection (RefineDet), Retina-Net, deformable convolutional networks, zero-shot object detectors, transformer-based networks (e.g., Detection Transformer (DETR)), and/or be any other suitable model. The property component model can be trained based on manual labels (e.g., manually drawn bounding boxes), bounding boxes drawn around property component segments, bounding boxes drawn around geofences or masks, and/or any other suitable training targets. Additionally and/or alternatively, the property component model can be trained or tuned using training measurements annotated with component instances and/or otherwise generated. However, components can be otherwise used to determine the property attribute value.

However, the one or more property attribute models can be otherwise configured.

The one or more parcel models can function to determine a parcel class (e.g., unit parcels, surrounding parcels, standalone parcels, etc.) for a parcel (further described below). The system 10 can include one or more parcel models for: one or more parcel classes, one or more locations, one or more property classes, combinations thereof, and/or any other suitable parameters. Each parcel model can be specific to a parcel class, a location, a location type, a property class, a property subclass, and/or be otherwise specific. Additionally and/or alternatively, the parcel model can be generic across parcel classes, locations, location types, property classes, property subclasses, and/or be otherwise generic. The parcel model can include: rules, heuristics, a classifier, and/or any other suitable model and/or methodology.

Inputs to each parcel model, used to determine a parcel class for parcel(s) of interest, can include: parcels, building segments (e.g., extracted using a building segmentation model, a property component model, etc.), property information (e.g., images, geometric measurements, etc.; examples described above), and/or any other suitable set of inputs.

Outputs of each parcel model can include: parcel classes, binary values associated with a parcel class, parcel identifiers, property information, uncertainty parameters (e.g., a confidence score for parcel class prediction), and/or any other suitable outputs.

A parcel model can be: a CNN, a DNN, a foundation model, a classifier, and/or any other suitable model. The parcel model can be trained or tuned using a set of parcels labeled with classes, and/or otherwise generated.

However, the one or more parcel models can be otherwise configured.

The one or more group determination models can function to determine whether a property is part of a group (further described below). The system 10 can include one or more group determination models for: one or more parcel classes, one or more locations, one or more property classes, combinations thereof, and/or any other suitable parameters. Each group determination model can be specific to a parcel class, a location, a location type, a property class, a property subclass, and/or be otherwise specific. Additionally and/or alternatively, the group determination model can be generic across parcel classes, locations, location types, property classes, property subclasses, and/or be otherwise generic. The group determination model can include: the parcel model (described above), rules, heuristics, a classifier, a foundation model, and/or any other suitable model and/or methodology. The group determination model can be trained or tuned on measurements labeled with group membership, wherein the group membership can be determined based on heuristics, a manual label, or another method; be verified against ground-truth group membership (e.g., determined based on heuristics, a manual label, or another method); and/or be otherwise generated.

Inputs to each group determination model can include: parcels, parcel classes (e.g., unit parcel, surrounding parcel, standalone parcel, etc.), building segments (e.g., extracted by the building segmentation model, the property component model, etc.), property information (e.g., measurements, features, other examples described above, etc.), and/or any other suitable set of inputs.

Outputs of each group determination model can include: binary values of whether the property is part of a group, a set of parcel identifiers, a set of parcel classes, property information, a boundary surrounding the properties within a group, uncertainty parameters (e.g., a confidence score for prediction of whether the property is part of a group, and/or any other suitable outputs.

However, the one or more group determination models can be otherwise configured.

The one or more expansion models can function to determine other properties that are part of the group when the property is determined to be part of the group (further described below). The system 10 can include one or more expansion models for: one or more parcel classes, one or more locations, one or more property classes, combinations thereof, and/or any other suitable parameters. Each expansion model can be specific to a parcel class, a location, a location type, a property class, a property subclass, and/or be otherwise specific. Additionally and/or alternatively, the expansion model can be generic across parcel classes, locations, location types, property classes, property subclasses, and/or be otherwise generic. The expansion model can include: rules, heuristics, a classifier, and/or any other suitable model and/or methodology. The expansion model can be trained or tuned on measurements labeled with all properties within a group; be verified against all ground-truth properties within a group (e.g., determined based on heuristics, a manual label, or another method); and/or be otherwise generated.

Inputs to each expansion model can include: parcels (e.g., parcels of the property of interest, adjacent parcels to the parcels of the property of interest, parcels associated with neighboring properties to the property of interest, etc.), parcel classes (e.g., unit parcel, surrounding parcel, standalone parcel, etc.), parcel information (e.g., parcel information for a single parcel, parcel information for combined parcels, etc.), building segments (e.g., extracted by the building segmentation model, component model, etc.), property information (e.g., attributes, measurements, features, descriptive parameters, other examples described above, etc.), neighboring properties, neighboring properties' information, public roads, fences, hedges, walkways, other dividing objects, and/or any other suitable set of inputs.

Outputs of each expansion model can include: other properties that are part of the group, a set of property identifiers, a set of parcel identifiers, a set of parcel classes, property information, a boundary surrounding the properties within a group, uncertainty parameters (e.g., a confidence score), and/or any other suitable outputs.

However, the one or more expansion models can be otherwise configured.

The one or more confidence score models can function to determine a confidence score (e.g., the likelihood a prediction is correct) for the shared group prediction (further described below). Additionally or alternatively, the confidence score can be determined by the expansion model, the group determination model, the parcel model, and/or any other suitable model. The system 10 can include one or more confidence score models for: one or more parcel classes, one or more locations, one or more property classes, combinations thereof, and/or any other suitable parameters. Each confidence score model can be specific to a parcel class, a location, a location type, a property class, a property subclass, and/or be otherwise specific. Additionally and/or alternatively, the confidence score model can be generic across parcel classes, locations, location types, property classes, property subclasses, and/or be otherwise generic.

The confidence score model can include: an equation, a regression, rules, heuristics, a classifier, a neural network, and/or any other suitable model and/or methodology. The confidence score model can be trained or tuned on labeled auxiliary features (e.g., number of parcels, number of parcels for each parcel class, etc.) for the group of properties; be verified against ground-truth attributes and/or components for the group of properties; and/or be otherwise generated.

Inputs of each confidence score model can include: properties within a group and/or the group of properties (e.g., determined by the expansion model), parcels (e.g., parcels associated with the properties within a group), parcel classes (e.g., unit parcel, surrounding parcel, standalone parcel, etc.), auxiliary features (e.g., number of parcels, parcel classes, number of parcels for each parcel class, number of buildings, similarity of appearances between buildings, etc.), building segments, property information (e.g., attributes, measurements, features, descriptive parameters, other examples described above, etc.), neighboring properties, neighboring properties' information, and/or any other suitable set of inputs.

Outputs of each confidence score model can include: confidence scores, other uncertainty parameters, a set of property identifiers (e.g., property identifiers of properties within a group ingested by the confidence score model, property identifiers for properties that scores have been calculated for, etc.), a set of parcel identifiers, property information, and/or any other suitable outputs.

However, the one or more confidence score models can be otherwise configured.

However, the system 10 can include and/or be used with any other suitable models.

The system 10 can include one or more computing systems 110, which can function to execute all or portions of the method, execute one or more modules of the system 10, and/or perform any other suitable functionality. The computing system 110 is preferably a remote computing system (e.g., a platform, a server system, etc.), but can additionally and/or alternatively be performed by a distributed computing system, a local computing system (e.g., a user device such as a smartphone, a laptop, a desktop, a tablet, etc.), a centralized computing system, a combination thereof, and/or any be otherwise configured. The computing system 110 can be used with a user interface or not be used with a user interface. The user interface can be used to: receive and/or input property identifiers and/or property requests, present attribute values, present feature values, present groups of properties, present confidence scores, and/or be otherwise used. The user interface can be: a graphic user interface, a command line interface, an application programming interface (API), and/or any other suitable type of interface. The interface can be an application (e.g., browser application, native application, etc.) on a user device (e.g., laptop, desktop, mobile phone, tablet, etc.), an API, and/or any other suitable interface. The computing system 110 can optionally interface with the one or more databases 120.

In variants, the one or more computing systems 10 can include one or more computing modules, which can function to facilitate execution of method elements. The one or more computing modules can be executed contemporaneously, synchronously, asynchronously, in series, in parallel, and/or be otherwise implemented. In a first example, the computing system 110 can include a first computing module which functions to determine a property in accordance with S100, a second computing module which functions to determine whether the property is part of a group in accordance with S200, and a third computing module which functions to identify other properties within the group in accordance with S300. In a second example, the computing system 110 can include a single computing module which can function to facilitate execution of an instance of the method. However, the one or more computing modules can be otherwise configured.

However, the one or more computing systems no can be otherwise configured.

The system 10 can include one or more databases 120, which can function to store property data such as: property identifiers, property information (e.g., measurements, auxiliary data, etc.), attribute values, feature values, parcels, groups of properties, confidence scores, and/or any other suitable information. The database 120 can be a remote database, a local database, a distributed database, a centralized database, a cloud database, a combination thereof, and/or any be otherwise configured. The database 120 can be a NoSQL database, a relational database (RDS), a hierarchical database, and/or any other suitable database. The database 120 is preferably queryable (e.g., based on a property identifier) to retrieve property data, but can additionally and/or alternatively not be queryable. The database 120 can be and/or interface with a third-party source (e.g., a third-party database, a real estate listing database, tax assessor database, city permitting database, etc.), but can alternatively not interface with a third-party source. The information in the database 120 can be retrieved from, linked to, and/or be otherwise associated with a third-party source. For example, a property identifier for each of a set of properties is stored in the database 120, wherein attribute values are stored in association with the corresponding property identifier for all or a subset of the properties. Attribute values can optionally be edited and/or appended to the database 120 when new property information (e.g., recent imagery or other measurements) is added.

However, the one or more databases 120 can be otherwise configured.

However, the system 10 can include any other suitable components.

5. Method

The method can include: determining a property S100, determining whether the property is part of a group S200, identifying other properties within the group S300, optionally determining whether to merge groups S400, optionally providing a final group S500. However, the method can be otherwise performed.

The method functions to determine a set of properties associated with a group (e.g., that are members of the group).

A group preferably includes a set of properties and/or parcels associated with a common entity (e.g., HOA, legal entity, organization, developer, other entity, etc.), but can additionally and/or alternatively be associated with different entities, include a set of otherwise-related properties, and/or be otherwise defined. Examples of properties in a group include condominiums, apartments, townhouses, mobile homes, commercial developments (e.g., industrial developments, manufacturing developments, retail businesses, etc.), communities (e.g., residential communities, commercial communities, etc.), and/or any other suitable property type. The property can be a parcel (e.g., land), a built structure (e.g., primary built structure, etc.), a segment of a built structure (e.g., a room, a garage, etc.), fixtures, a physical structure (e.g., a pool, a tennis court, a statue, etc.), vegetation (e.g., a tree, a garden, hedges, etc.), a combination thereof, and/or any other suitable object. For example, the property can include both the underlying land and improvements (e.g., built structures, fixtures, etc.) affixed to the land.

In a first illustrative example, properties sharing a common set of property information (e.g., appearance features, geometric features, etc.) with parcels satisfying a predetermined set of conditions (e.g., are nested within a common, larger parcel; are contiguous; etc.) can be aggregated into a group. In a second illustrative example, once a first property (or set thereof) is identified, other properties related to the first property or set thereof (e.g., sharing common property information, having parcels satisfying the set of conditions, etc.) can be added into a group seeded by the first property or set thereof. However, the groups can be otherwise formed.

One or more instances of the method can be performed for one or more properties, one or more groups, one or more timeframes, one or more measurements, one or more attribute sets and/or attribute value sets, one or more property attribute models, one or more property component models, one or more group determination models, one or more confidence score models, and/or otherwise performed.

All or portions of the method is preferably performed by the system 10 disclosed above (e.g., a remote system such as a platform), but can additionally and/or alternatively be performed by a local system, a third-party system, and/or any other suitable system.

All or portions of the method can be performed: in response to receiving a request (e.g., for a property) from an endpoint, before receipt of a request, upon occurrence of a predetermined event, upon receipt of a new measurement, upon determination of a new attribute value, upon determination of a new feature value, once, periodically, repeatedly, randomly, and/or at any other suitable time and/or frequency. In an example, the method can be executed in response to a user request (e.g., via an API) for determining properties that are part of a shared group, given a property (e.g., an address). In another example, various portions of the method can be pre-computed for properties (e.g., attribute values can be precomputed and/or stored in a database 120) prior to a user request for determining properties that are part of a shared group.

The method can be iteratively performed for individual properties (e.g., a property first is classified as part of a group, then an adjacent property is analyzed for inclusion in the group, etc.); be concurrently performed for multiple properties (e.g., identified in a request, wherein the request can include one or more property identifiers; depicted in a measurement; etc.); and/or performed serially and/or in parallel for any other suitable number of properties.

However, the method can be used with any other set of data.

5.1. Determining a Property S100.

Determining a property S100 functions to determine a starting property that can belong to a group. S100 can be performed before S200, concurrently with S200, after S200, concurrently with S300, and/or at any other suitable time. The property can be: one property, multiple properties, and/or any other suitable number of properties. The property can be: a real property (e.g., land and built structure), a built structure, a segment of a built structure, and/or any other suitable subject (described above). The property is preferably identified by a property identifier (e.g., geocoordinates, a parcel identifier, an address, a lot number, a geofence, etc.), but can additionally and/or alternatively be identified by any other suitable identifier. The property can be received from a user (e.g., on an interface), as part of a request (e.g., an API request) from an endpoint, retrieved from a database 120 using a property identifier (e.g., an address), and/or otherwise determined. The property can be received as a standalone property, received as part of a set of properties, and/or otherwise received. The set of properties can be determined from: a list of properties, properties within a geographic region (e.g., properties within a town, properties along a street, etc.), and/or otherwise determined.

However, the property can be otherwise determined.

S100 can optionally include determining a set of measurements for the property. The set of measurements can include: one measurement, multiple measurements, and/or any other suitable number of measurements. Each measurement is preferably a remote measurement (e.g., an image taken from a remote scene, aerial image, satellite image, drone image, etc.), but can additionally and/or alternatively include a local measurement, and/or any other suitable measurement. The measurement is preferably a 2D measurement, but can additionally and/or alternatively be a 3D measurement, and/or any other suitable measurement. The measurement can be or include: an image (e.g., RGB image, grayscale image, etc.), a digital surface model (DSM), a digital elevation model (DEM), a digital terrain model (DTM), an audio, a video, point clouds (e.g., LiDAR, RADAR), meshes, a virtual model, and/or any other suitable measurement. The measurement can be a top-down measurement, an oblique measurement, and/or any other suitable measurement taken from any other angle. The measurement is preferably associated with (e.g., depicts) multiple properties including the property, but can additionally and/or alternatively be associated with only the property (e.g., a property-specific measurement, wherein a wide-scale measurement depicting the property can be cropped using the parcel data), not be associated with the property, be associated with the property parcel(s), and/or otherwise associated with a property. The measurement is preferably the most recent measurement of the property (e.g., based on a timestamp of when the measurement was captured), but can additionally and/or alternatively be an older measurement of the property (e.g., a measurement that was contemporaneously sampled with a historical valuation for the property), a measurement sampled during a predetermined time or timeframe (e.g., a user-specific timeframe), and/or a measurement captured at any other suitable time. The measurement can be associated with contextual parameter values (e.g., associated with the measurement context), or not be associated with contextual parameter values. Contextual parameter values can include: a scene class (e.g., interior scene measurement, exterior scene measurement, etc.), a perspective (e.g., front elevation, rear elevation, side elevation, top planar view, isometric view, etc.), a provider, a modality, a real estate listing service, a season, a time of day, a timestamp, and/or any other suitable parameter value. The measurement can be: retrieved from a database 120 (e.g., using a property identifier such as an address), received from a real estate listing service (e.g., a multiple listing service, Redfin™, etc.), received from an image provider (e.g., a satellite image provider, drone image provider, etc.), received from other third-parties, and/or otherwise determined. However, the set of measurements can be otherwise determined.

However, the set of measurements for the property can be otherwise determined.

S100 can optionally include extracting a building segment from the measurement, which functions to identify continuous or contiguous buildings from the measurement based on appearance, geometry, and/or parcel data. The building segment is preferably extracted by a property component model (e.g., described above), but can additionally and/or alternatively be extracted by a different property attribute model, and/or any other suitable model. In a first example, the building segment can be extracted by an object detector (e.g., using a classification model, segmentation model, using shape-fitting, etc.). In this example, the building segment can be segmented using clear visual cues (e.g., based on color, based on texture, etc.) or otherwise segmented. In a second example, the building segment can be extracted by a segment anything model (SAM) that outputs a segmentation mask (e.g., a binary mask). In a third example, the building segment can be extracted by using a method such as that discussed in U.S. application Ser. No. 17/529,836 filed on 18 Nov. 2021, which is incorporated in its entirety by this reference.

However, the building segment can be retrieved from a database 120, received from a third-party, and/or otherwise determined.

Figure 3:
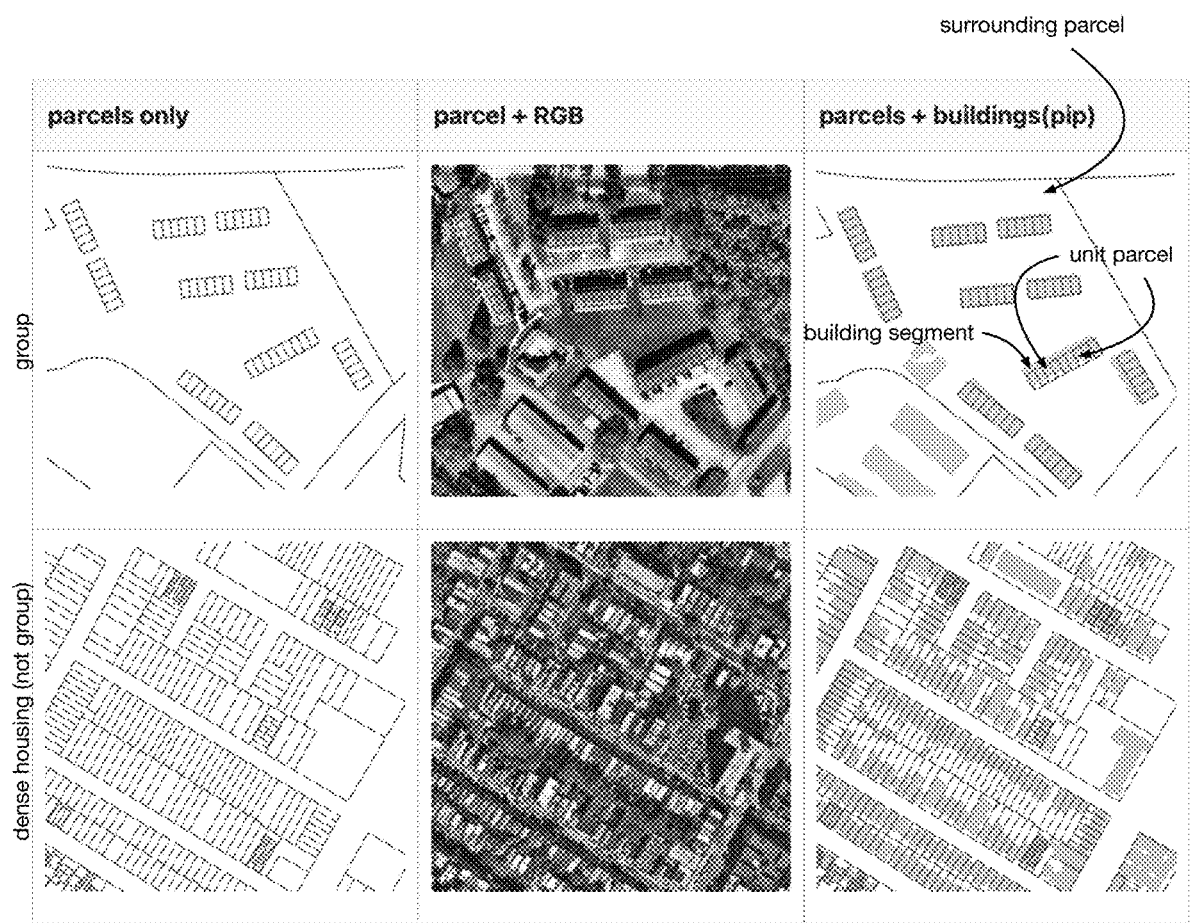
FIG. 3 is an illustrative example of parcels and/or building segments.

S100 can optionally include determining one or more parcels for the property. A parcel preferably defines a boundary of a parcel (example shown in FIG. 3), but can additionally and/or alternatively define the area encompassed by a parcel, and/or define other parcel parameters. Parcels are preferably defined by state and/or federal regulators (e.g., tax assessors), but can additionally and/or alternatively be defined by an organization, an individual, a user, and/or any other suitable entity. Parcels can include: a parcel boundary, a property boundary (e.g., a land boundary), a geofence, a region, a mask, a parcel shape, a parcel position, and/or any other suitable information. Parcels can be georeferenced (e.g., aligned with an external geographic coordinate system), referenced to the measurement (e.g., referenced to image coordinates), and/or otherwise referenced. Parcels can be retrieved from a database 120, received from a third-party, inferred using a model, and/or otherwise determined. In examples, parcels can be determined using methods as discussed in U.S. application Ser. No. 17/546,620 filed 9 Dec. 2021 and/or U.S. application Ser. No. 17/529,836 filed 18 Nov. 2021, each of which is incorporated in its entirety by this reference.

In a first variant, determining one or more parcels for the property can include determining one or more parcels encompassing (e.g., but not necessarily intersecting) a property geolocation. In a first example, the parcel encompassing a property geolocation includes a parcel located within a predetermined distance of the property. In a second example, the parcel encompassing a property geolocation includes a parcel that the property geolocation falls within (e.g., the property geolocation falls within the outermost boundary of the parcel).

In a second variant, determining one or more parcels for the property can include determining a parcel intersecting a property geolocation (e.g., the property geolocation is within the parcel region or area).

In a third variant, determining one or more parcels for the property can include determining parcels associated with geolocations associated with (e.g., depicted within) the measurement. For example, the retrieved parcels can collectively encompass all, most, or a predetermined proportion of the geolocations depicted in the measurement.

However, the one or more parcels for the property can be otherwise determined.

Figure 4:
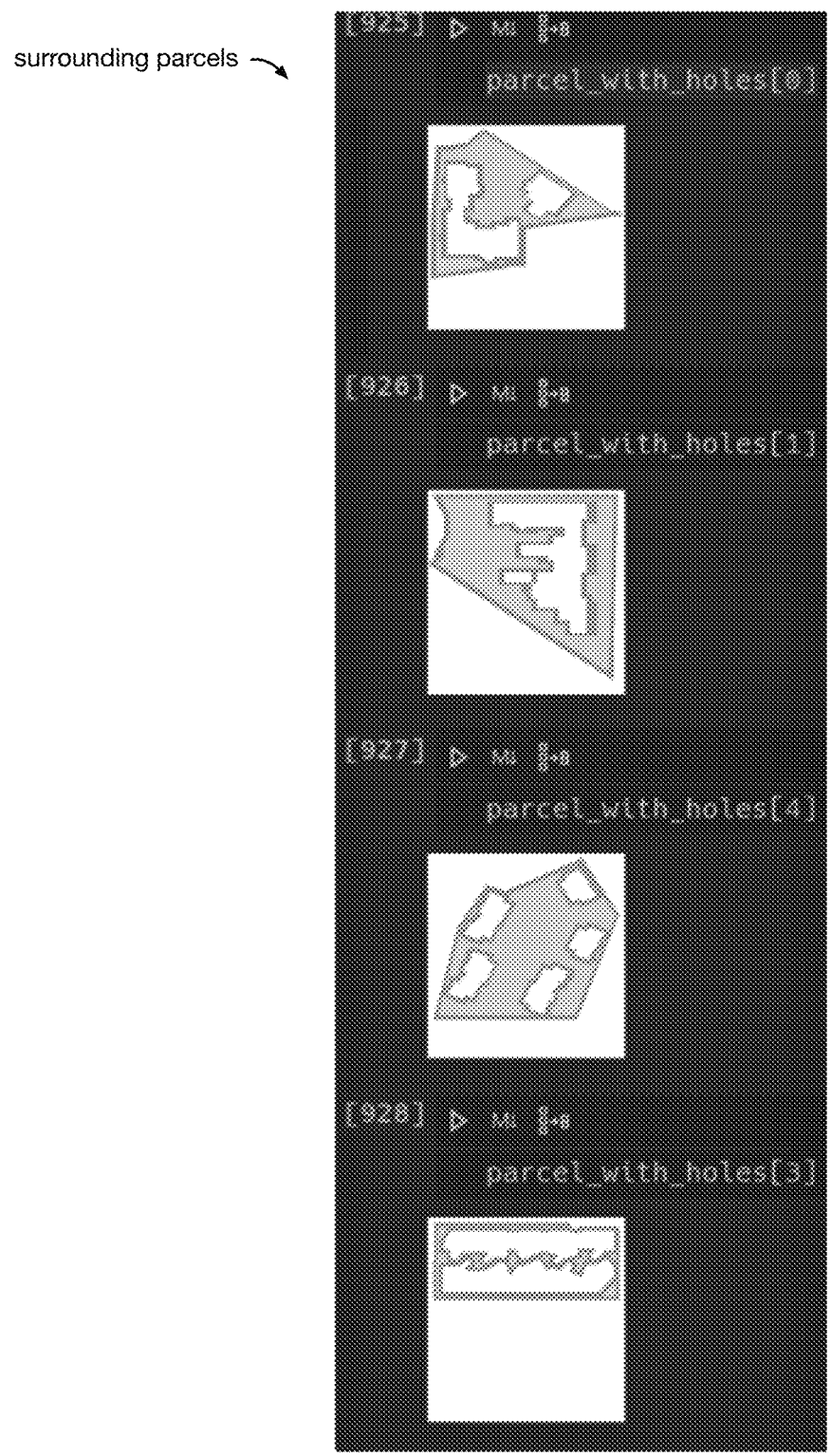
FIG. 4 is an illustrative example of surrounding parcels.

S100 can optionally include classifying the one or more parcels, which functions to determine a parcel class for each parcel, wherein the parcel class can be used (e.g., as part of a heuristic) to determine whether the parcel, addresses associated with the parcel, and/or building segment associated with the parcel are associated with a shared group. Parcel classes can include: unit parcels (e.g., a parcel that occupies only a partial area of a continuous roof structure and/or exterior area), surrounding parcels (e.g., a parcel that has holes, wherein each hole corresponds to a roof structure or a set of smaller parcels; a parcel that represents the common area of the group; example shown in FIG. 4; etc.), stand-alone parcels (e.g., a parcel that occupies entire roof structure(s)), and/or any other suitable parcel class. The parcel class for each parcel is preferably determined using a parcel model (described above), but can additionally and/or alternatively be determined using an attribute model, and/or any other suitable model and/or methodology.

In a first variant, classifying the one or more parcels can include determining a parcel class using a parcel model, such as a classifier, trained to classify one or more parcels based on shape, similarity to adjacent parcels, area, relationship to objects segmented out of a corresponding measurement, and/or any other suitable parcel parameter. In a first example, the classifier can be trained on parcels labeled with "unit parcel", "surrounding parcel", "stand-alone parcel", and/or other parcel classes, wherein the classifier learns to determine the parcel classification for an unknown parcel (e.g., based on features extracted from the parcel information). The labels for the training data can be manually determined, determined using heuristics (e.g., as discussed below), and/or otherwise determined. In a second example, the classifier can be trained on a set of parcels labeled with parcel-parcel relationships (e.g., this first parcel is associated with this surrounding parcel, while this second parcel is not associated with the surrounding parcel), wherein the classifier learns to determine a parcel's relationship with other parcels (e.g., based on features extracted from the information for the respective parcels). In a third example, the classifier can be trained on a combination of the training information from the first and second examples. However, the classifier can be otherwise structured, trained, and/or used.

In a second variant, classifying the one or more parcels can include determining a parcel class using a parcel model based on rules and/or heuristics.

In a first embodiment of the second variant, a parcel that intersects less than a threshold proportion of a building segment (e.g., less than 90%, 80%, 70%, 60%, 50%, 40%, 30%, any range therein or value therebetween, etc.) is classified as a unit parcel. The threshold can be manually determined (e.g., by a user) or be automatically determined (e.g., by a model). The threshold proportion can be predetermined (e.g., hardcoded, retrieved from a database 120, etc.) or be dynamically determined (e.g., based on a geographic region, based on a property type, etc.). In an illustrative example, a parcel that intersects (e.g., occupies) more than 0% and less than 90% (e.g., to account for error) of the building segment area is classified as a unit parcel. However, the threshold proportion can be any other suitable percentage.

Figure 9:
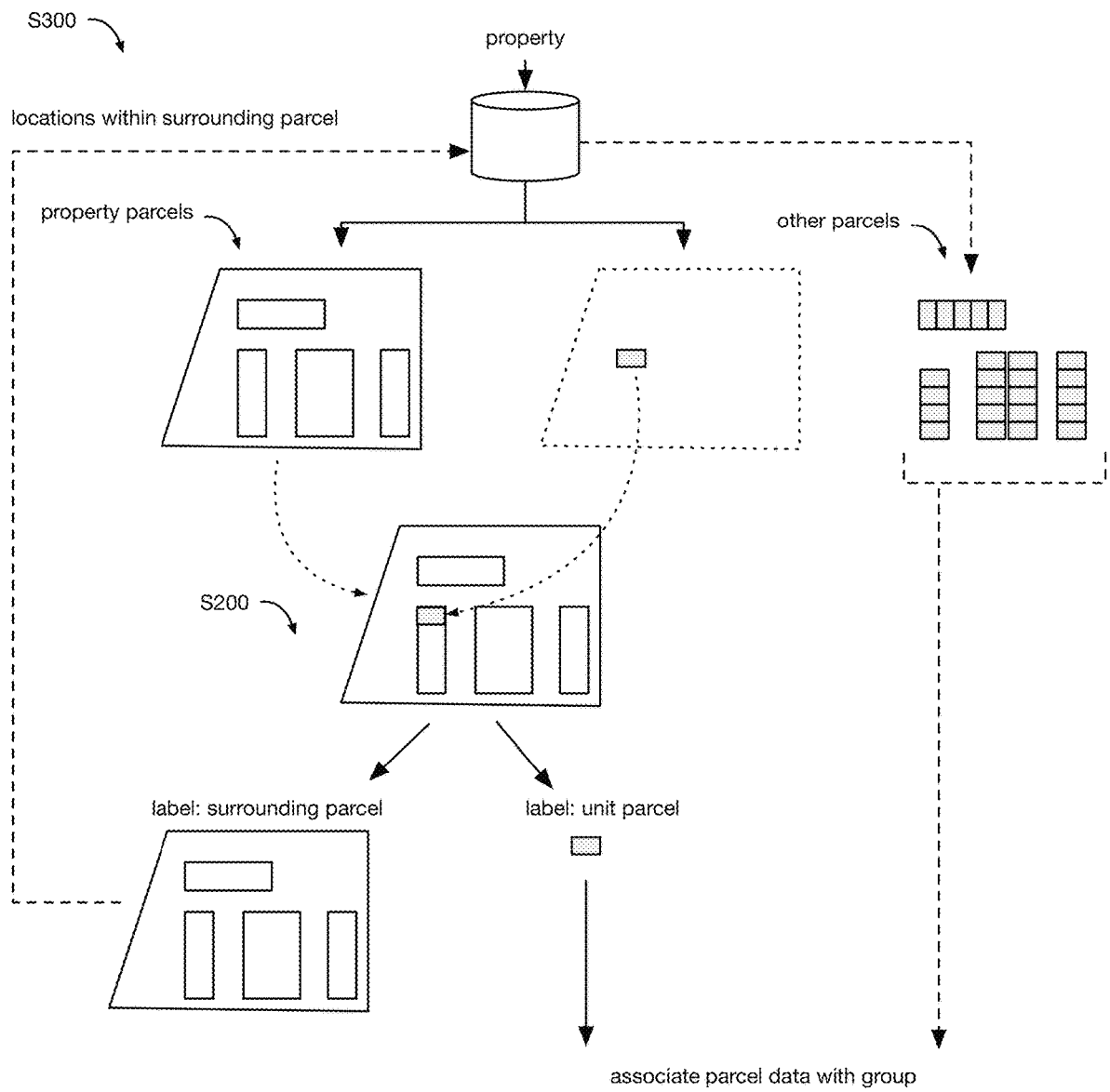
FIG. 9 is an illustrative example of identifying properties within a group based on parcels.

In a second embodiment of the second variant, a parcel with one or more holes is classified as a surrounding parcel. In a first example, any parcel with holes is classified as a surrounding parcel. In a second example, only parcels having more than a threshold proportion of holes that are unit-parcel shaped, roof-shaped, building-shaped, and/or otherwise property-shaped, and are not road-shaped, not pond-shaped, and/or otherwise non-property-shaped, are classified as surrounding parcels. In a third example, surrounding parcels can be defined as those having more than a threshold number or proportion of holes. In a fourth example, a parcel with smaller parcels that fall within (e.g., wholly encompassed within) holes of the parcel is classified as a surrounding parcel (example shown in FIG. 9). In a specific example, surrounding parcels can be defined as those encompassing at least one unit parcel (e.g., at least one unit parcel falls within a hole of the surrounding parcel). In a fifth example, a parcel with roof segments that fall within (e.g., wholly encompassed within) holes of the parcel is classified as a surrounding parcel. However, surrounding parcels can be otherwise defined.

In a third embodiment of the second variant, a parcel that fully intersects with a building segment is classified as a stand-alone parcel. Stand-alone parcels can fall within surrounding parcels and be classified as belonging to the shared group, or be otherwise used.

In a fourth embodiment of the second variant, a parcel can be classified as a unit parcel when the overall convexity of the parcel, fit against another parcel (e.g., an adjacent parcel), has a higher convexity than the parcels' individual convexity.

In a fifth embodiment of the second variant, a parcel can be classified based on the feature values and/or attribute values (e.g., using heuristics, a classifier, etc.).

However, the parcel can be otherwise determined based on rules and/or heuristics.

However, the one or more parcels can be otherwise classified.

S100 can optionally include determining parcel information for one or more parcels. The parcel information can be determined for a single parcel, for each parcel of multiple parcels, for combined multiple parcels (e.g., geometric interactions of multiple parcels such as combined shape of multiple parcels), and/or otherwise determined. The parcel information can be associated with one parcel, multiple parcels, and/or any other suitable number of parcels. Parcels can be adjacent to each other or not be adjacent to each other. Parcel information can include: parcel boundary, parcel position, parcel area, parcel shape, parcel perimeter, parcel convexity, other parcel geometry, and/or any other suitable information. In examples, the parcel information includes a convexity of a boundary for a single parcel and/or a convexity of boundary for combined parcels.

However, the parcel information for one or more parcels can be otherwise determined.

5.2. Determining Whether the Property is Part of a Group S200.

Determining whether the property is part of a group S200 functions to aggregate the property with other properties of the same group, and/or to determine that a group should exist. S200 can be performed after S100, concurrently with S100, before S300, concurrently with S300, and/or at any other suitable time. The group can be: one group, multiple groups, and/or any other suitable number of groups. Whether the property is part of a group is preferably automatically determined (e.g., by a model), but can additionally and/or alternatively be manually determined (e.g., by an inspector, by a user on an interface, etc.). Whether the property is part of a group can be determined using: a group determination model (e.g., rules, heuristics, a classifier, etc.), a parcel model, and/or any other suitable model and/or methodology. In variants, models and/or methodologies can be tuned and/or adjusted for a use case.

S200 can determine: whether a group exists; whether a given property is or should be part of a group (e.g., a binary determination); which group a property should belong in (e.g., which set of properties the property should be included within; which group identifier should be assigned to the property; whether a group encompasses a property; etc.); and/or otherwise determine property membership within a group.

Figure 11:
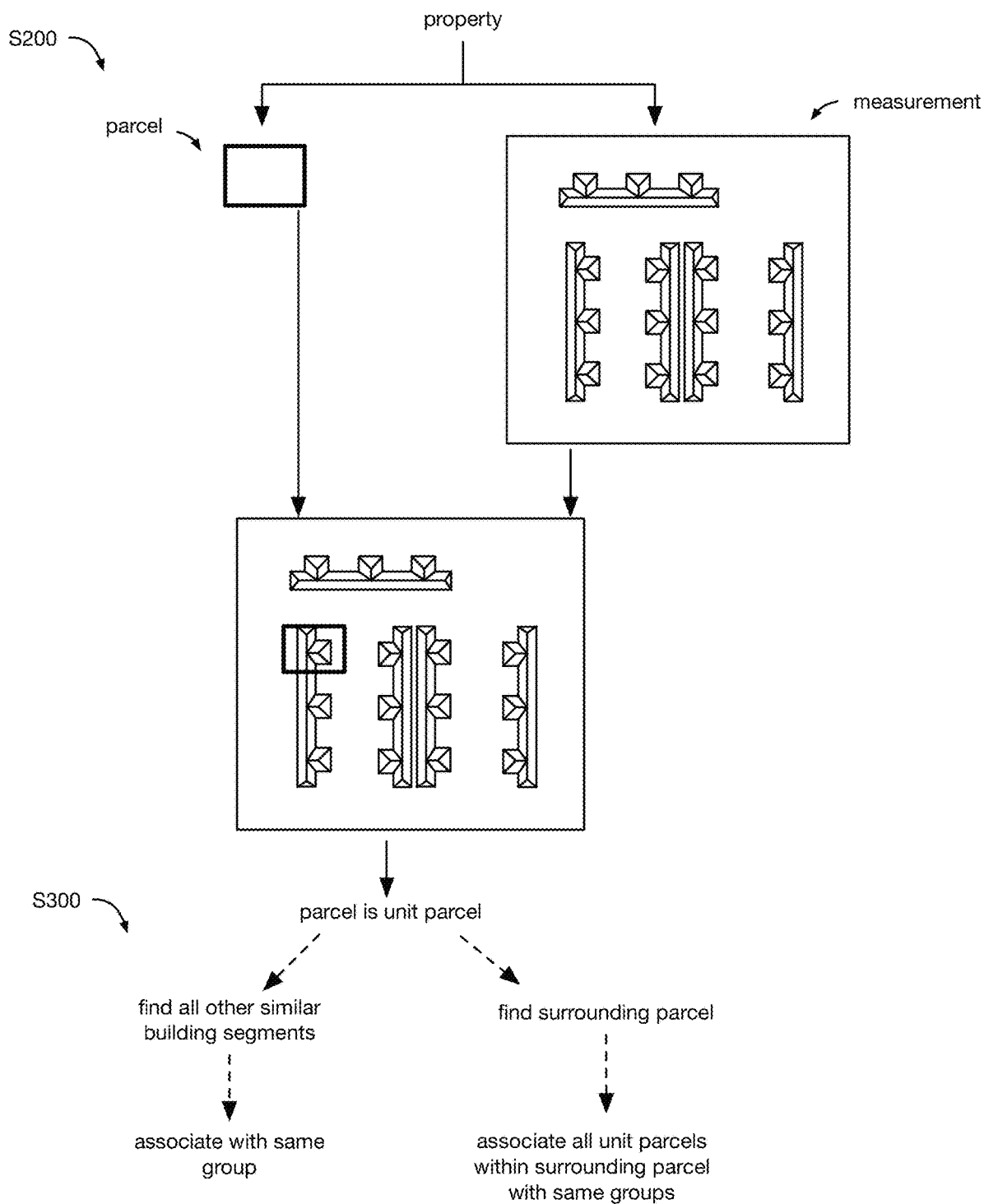
FIG. 11 is an illustrative example of identifying properties within a group based on appearance and/or surrounding parcels.

In a first variant, S200 can be performed based on the parcel classification for a given property. In this variant, different parcel classifications can be associated with whether or not a property should be part of a group (e.g., a binary determination), wherein a downstream process can be used to determine which group the property should be associated with. For example, if a parcel associated with the property is classified as a unit parcel (e.g., the parcel intersects a building segment extracted from a measurement depicting the property), the property is determined to be part of a group (example shown in FIG. 11). Otherwise, the property is determined to not be part of a group. property membership within a group can be otherwise determined based on the property's parcel's classification.

Figure 5:
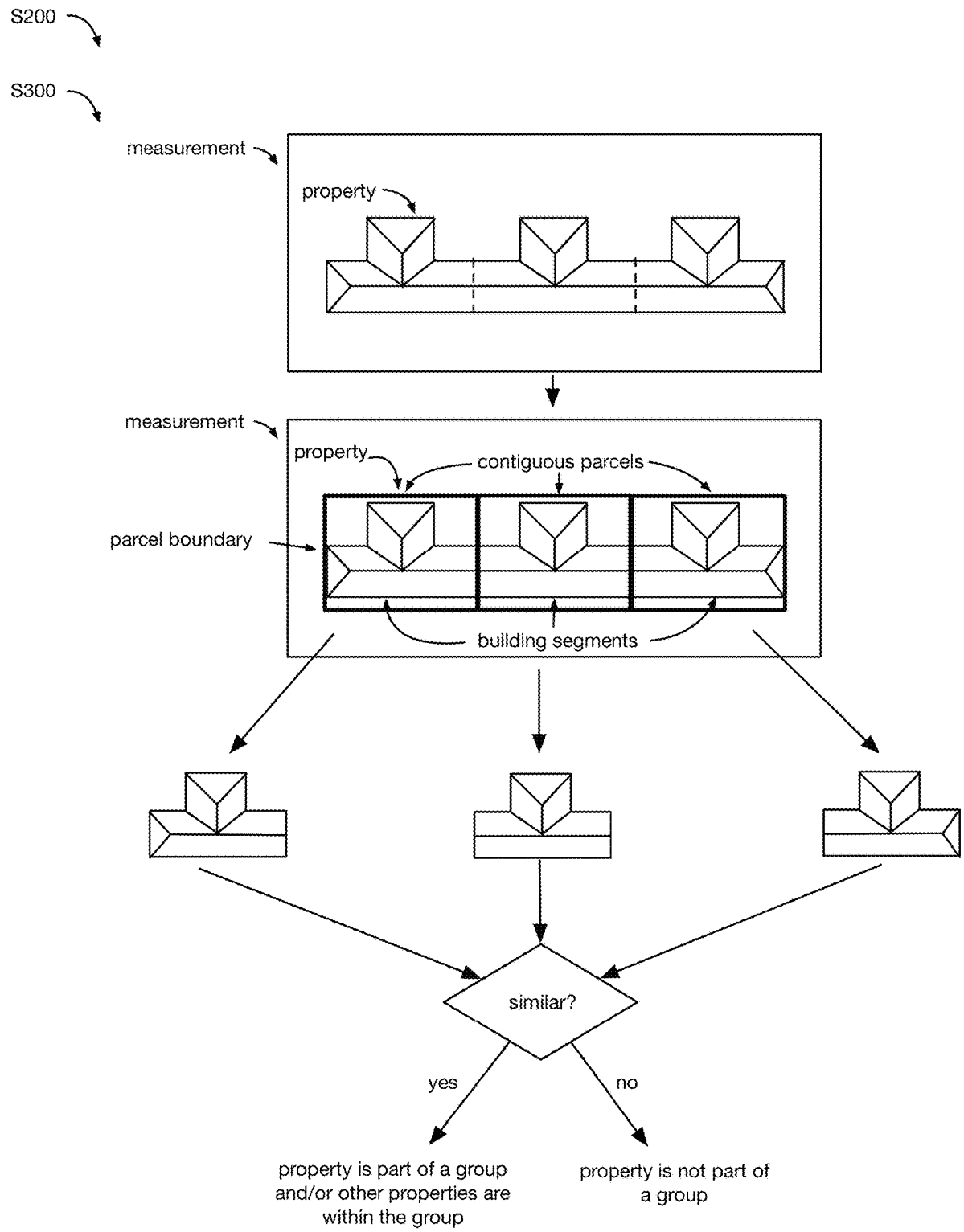
FIG. 5 is an illustrative example of identifying other properties within a group based on building segments.
Figure 10:
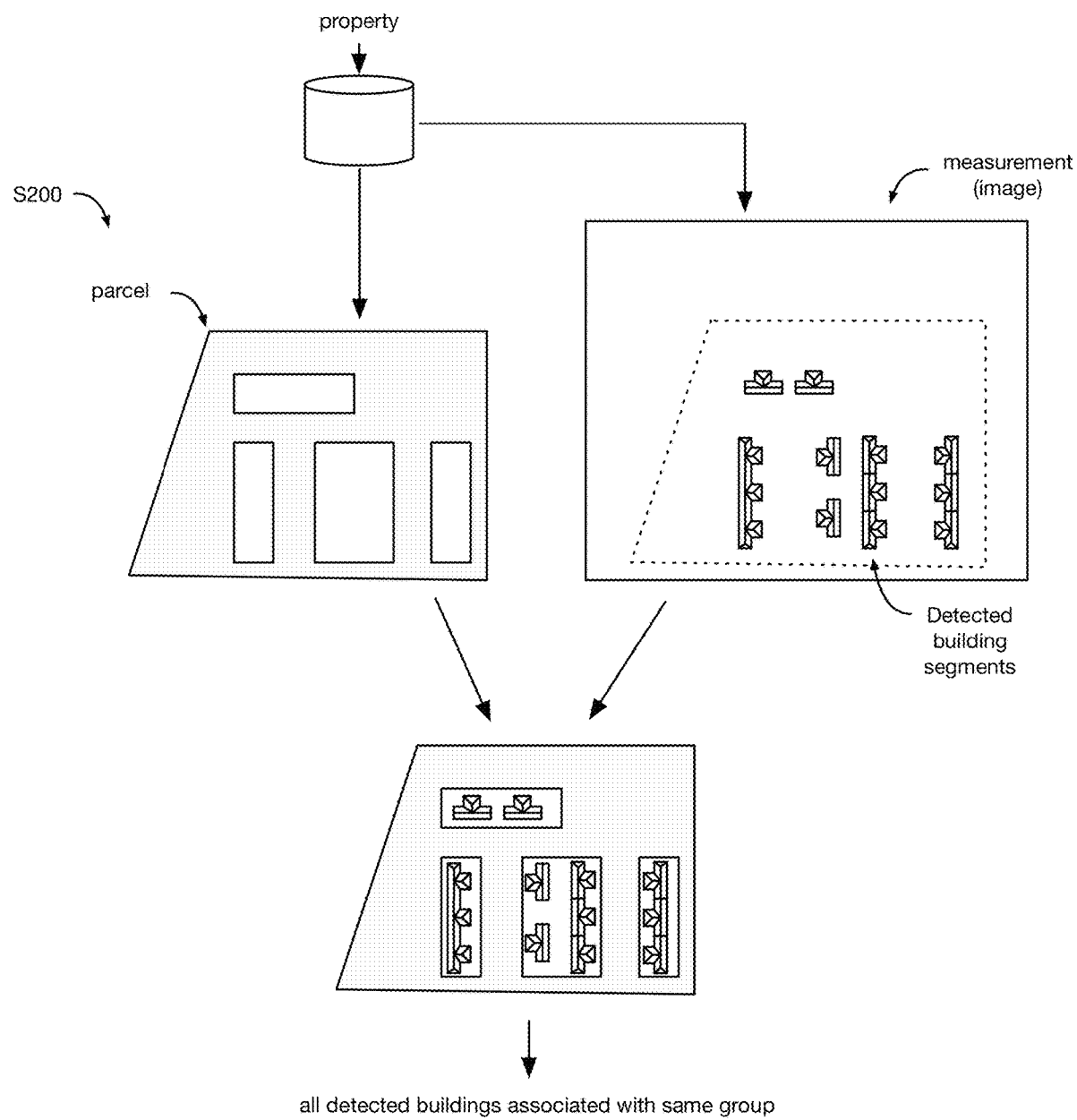
FIG. 10 is an illustrative example of identifying properties within a group based on a comparison between the detected building segments and voids in a surrounding parcel.

In a second variant, whether the property is part of a group can be determined based on property information similarity between the building segments detected within proximal parcels. In this variant, the building segments can be determined using parcel information (e.g., only a measurement region corresponding to the parcel is segmented), or be determined without using parcel information (e.g., building segmentation is performed without the parcel) and associated with the parcel after segmentation. In an embodiment, if a building segment associated with the parcel has the same appearance and/or features as a building segment associated with an adjacent parcel, the property is determined to be part of a group. Otherwise, the property is determined to not be part of a group. For example, two properties can be associated with the same group when they are located within adjacent or proximal parcels (e.g., separated by less than a threshold distance), and when the features and/or attributes extracted from the respective building segments (e.g., appearance features, geometric features, attribute values, etc.) are separated by less than a threshold distance in feature space (e.g., less than a threshold cosine distance, Euclidean distance, Manhattan distance, Chebychev distance, etc.); example shown in FIG. 5. Otherwise, the property is determined to not be part of a group. In a third embodiment, if a building segment depicting the property or the parcel associated with the property falls within a hole in a surrounding parcel, the property is determined to be part of a group (example shown in FIG. 10). Otherwise, the property is determined to not be part of a group. However, property membership within a group can be otherwise determined based on the property information similarity between properties with proximal parcels.

Figure 6:
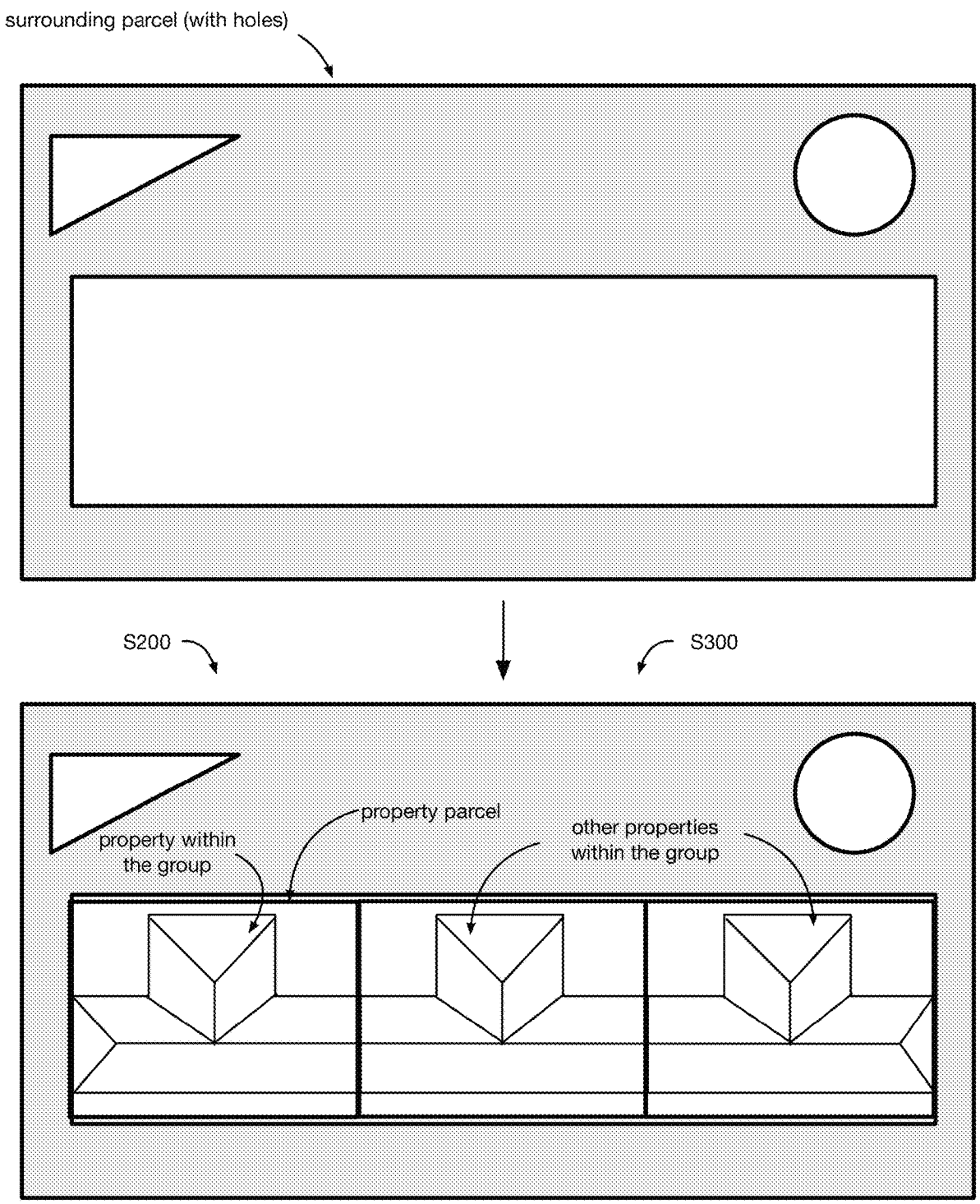
FIG. 6 is an illustrative example of identifying other properties within a group based on a surrounding parcel.

In a third variant, whether the property is part of a group can be determined based on a second parcel that entirely or partially surrounds the parcel associated with the property. For example, if a parcel associated with the property falls within (e.g., wholly encompassed within) a hole of a surrounding parcel, the property is determined to be part of a group associated with the surrounding parcel (example shown in FIG. 9). Otherwise, the property is determined to not be part of a group; example shown in FIG. 6. However, property membership within a group can be otherwise determined based on the property's parcel's relationship with surrounding parcels.

In a fourth variant, whether the property is part of a group can be determined based on the property's relationship to a predetermined set of property components (e.g., property components that have a high probability of being shared, such as a pool and/or a tennis court). In a first example, if the property is within a threshold distance (e.g., 100 ft, 1000 ft, 10000 ft, any range therein or value therebetween, etc.) from a component segment for a component of the predetermined set (e.g., determined from the same or different measurement from the building segment, such as a pool and/or a tennis court segment, determined using an object detector; a manually-specified location of the component, etc.), the property is determined to be part of a group associated with the component. In a second example, if a parcel associated with the property is within a threshold distance from a hole of surrounding parcel, wherein the hole of the surrounding parcel is in the shape of a component of the predetermined set, the property is determined to be a part of a group associated with the component. The threshold distance can be manually determined (e.g., by a user) or be automatically determined (e.g., by a model). The threshold distance can be predetermined (e.g., hardcoded, retrieved from a database, etc.) or be dynamically determined (e.g., based on a geographic region, based on a property type, based on a population, etc.). However, property membership within a group can be otherwise determined based on the property's relationship (e.g., building segment relationship, parcel relationship) with a set of predetermined property components.

In a fifth variant, a property can be considered part of a group when the property's parcel intersects a contiguous building segment. This can occur when a row of different properties share a common roof, when the roofs of the different properties appear uniform enough to be segmented as a unitary building segment by the building segmentation model, or otherwise occur. The property can be considered part of the group when the respective parcel overlaps less than 50% of the intersected building segment, less than 60% of the intersected building segment, less than 80% of the intersected building segment, and/or is otherwise related to the intersected building segment. However, property membership within a group can be otherwise determined based on the property parcel's relationship with building segments overlapping the property parcel.

In a sixth variant, whether the property is part of a group can be manually specified.

However, whether the property is part of a group can be otherwise determined.

5.3. Identifying Other Properties within the Group S300.

Identifying other properties within the group S300 functions to determine other properties that are part of the group if the property is part of the group. S300 is preferably performed after the property is determined to be part of a group in S200, but can additionally and/or alternatively be performed concurrently with S200, before S400, concurrently with 400, and/or at any other suitable time. In a first variant, S300 can determine property membership in parallel. For example, S300 can determine whether each property should be within a group, then determine which group the properties belong to (e.g., determine properties that are candidate group members, then aggregate the candidate group member properties into groups). In a second variant, S300 can determine property membership serially. For example, S300 can identify a single property that should belong within a group, start a group based on the property, and identify other properties that belong to the same group as the first property. However, group expansion can be performed in any other suitable manner.

Other properties within the group are preferably automatically determined (e.g., by a model), but can additionally and/or alternatively be manually determined (e.g., by an inspector, by a user on an interface, etc.). Other properties within the group are preferably identified using an expansion model (e.g., rules, heuristics, a classifier, etc.), but can additionally and/or alternatively be identified by a parcel model, and/or any other suitable model and/or methodology.

Figure 12:
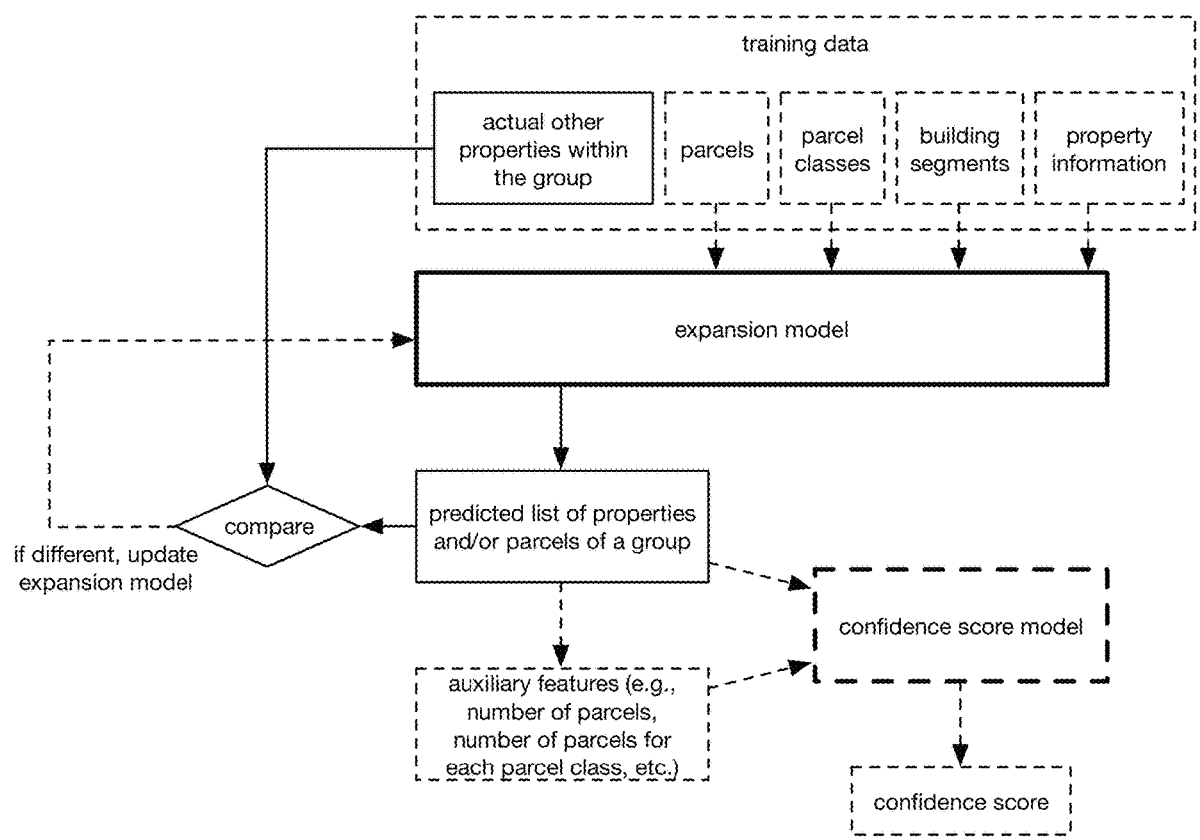
FIG. 12 is an illustrative example of training an expansion model.

In variants, the expansion model can be trained using training parcels (and/or parcel classes and/or building segments extracted therefrom) associated with ground-truth properties within the group; example shown in FIG. 12. The training target for the expansion model can be: binary, non-binary, numerical, categorical, discrete, continuous, and/or any other suitable characteristic. The training target can be determined from records (e.g., entity records, digital and/or physical records, etc.), manually determined (e.g., by an administrator, by an appraiser, etc.), determined by a third-party (e.g., an entity, real estate listing service, real estate marketplace, etc.), a combination thereof, and/or otherwise determined. Examples of training targets can include: properties known to be within a group (e.g., ground-truth properties within a group), properties labeled as belonging to a common group, parcels, parcel classes, parcel information, building segments, property information, and/or any other suitable training target. The expansion model can receive, as input: parcels (e.g., parcels of the property of interest, adjacent parcels to the parcels of the property of interest, parcels associated with neighboring properties to the property of interest, etc.), parcel classes, parcel information, building segments (e.g., building segment of the property of interest, adjacent building segments to the building segment of the property of interest, building segments associated with neighboring properties to the property of interest, etc.), property information (e.g., attributes, measurements, components, descriptive parameters, other examples described above, etc.), neighboring properties, neighboring properties' information, public roads, fences, hedges, walkways, other dividing objects, and/or any other suitable input. The expansion model can output a predicted list of properties of a group that can optionally be used to determine auxiliary features (e.g., number of parcels, parcel classes, number of parcels for each parcel class, number of buildings, similarity of appearances between buildings, etc.), and/or any other suitable output that can be used to determine any other suitable data. The auxiliary features are preferably determined manually (e.g., by a user on an interface), but can additionally and/or alternatively be determined automatically and/or otherwise determined. During inference, the predicted list of properties and/or parcels of a group and the associated auxiliary features can optionally be ingested by a confidence score model (described above), which outputs a confidence score (e.g., how likely the prediction is correct for the group); example shown in FIG. 12. However, the confidence score model can have any other suitable inputs and/or outputs. The predicted list of properties can be refined (e.g., by adding and/or removing a parcel and/or a property associated with the parcel) to maximize the confidence score and/or otherwise refined. A parcel and/or a property associated with the parcel to be added and/or removed from the list of properties can be determined using heuristics, probabilities, a different model, randomly, manually, and/or otherwise determined. For example, every subset combination of the set of predicted list of properties (e.g., greater than a particular number of properties) and the subset combination's associated auxiliary features are inputted into the confidence score model that outputs a confidence score, wherein the subset combination associated with the highest confidence score is selected.

In a first variant, S300 can include identifying other properties within the group based on a shared building segment. For example, all parcels overlapping the same continuous building segment are determined to be a part of the same group. By association, all properties associated with the parcels are determined to be part of the same group.

In a second variant, S300 can include identifying other properties within the group based on a surrounding parcel. In an example, S300 includes determining a surrounding parcel associated with the property, identifying other smaller parcels (e.g., unit parcels) that fit within the holes of the surrounding parcel, and associating the properties associated with the smaller parcels as a part of the group; example shown in FIG. 6. In another example, S300 includes determining a surrounding parcel associated with the property, optionally verifying that it is a surrounding parcel associated with a group (e.g., based on heuristics, a classification, etc., such as whether the surrounding parcel is associated with at least one of a predetermined set of components associated with groups, etc.), identifying building segments that fit within the holes of the surrounding parcel, and associating the properties associated with the building segments as part of the group.

Figure 7:
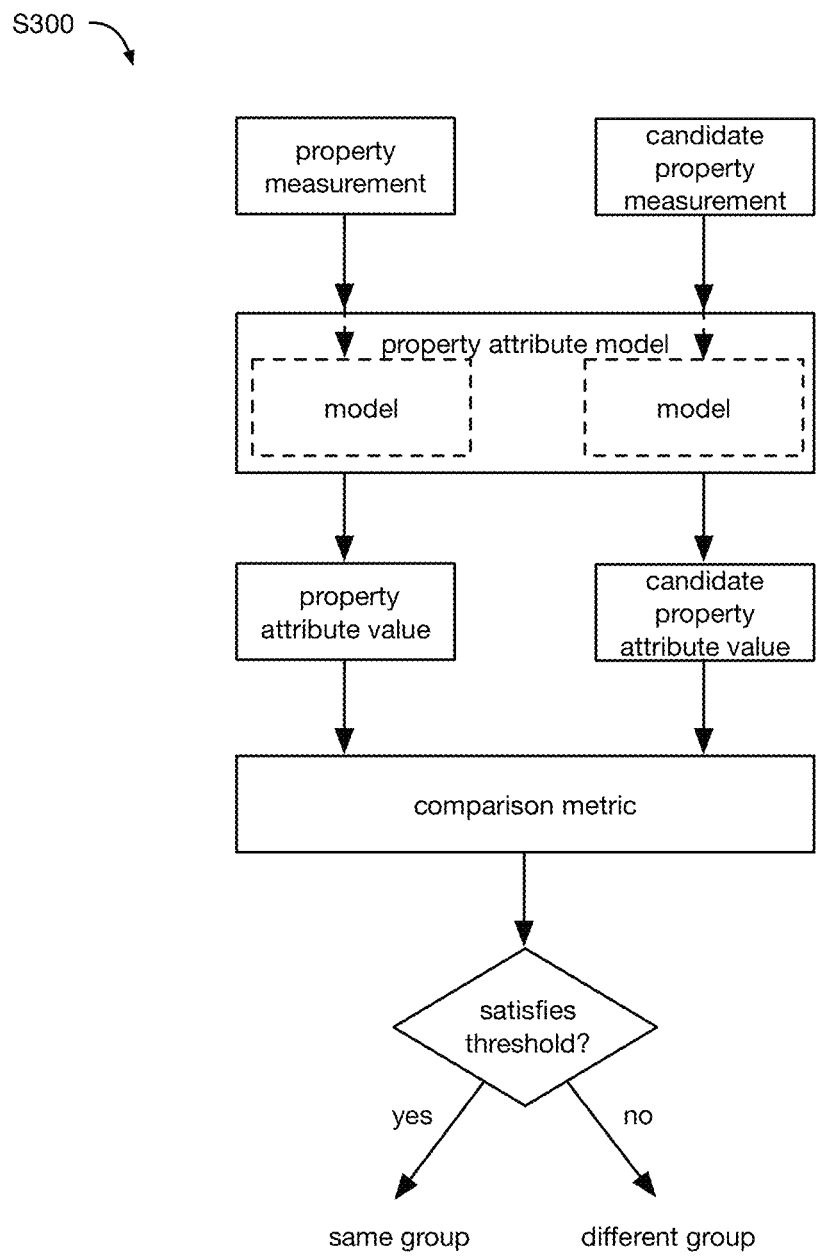
FIG. 7 is an illustrative example of identifying other properties within a group based on a comparison metric.

In a third variant, S300 can include identifying other properties within the group based on a comparison metric (e.g., similarity score), which can include: determining a set of neighboring properties (e.g., within a geofence/range of the property, within a surrounding parcel, within an area of a dividing object such as public roads, fences, hedges, and walkways, etc.) neighboring a reference property; determining a descriptive parameter for each property; determining a comparison metric between the neighboring property and the reference property based on the descriptive parameters; and associating the neighboring property as part of the same group if the respective comparison metric satisfies a threshold (e.g., similarity score exceeds a threshold, distance falls between a threshold, etc.). Additionally or alternatively, a neighboring property can be included within the group when the neighboring property has a descriptive parameter with a comparison metric that falls within a threshold of an aggregate descriptive parameter for the set of properties already within the group (e.g., an average feature vector, a majority feature vector, the most common attribute values, etc.). The reference property can be: the property, an outermost property determined to be within the group, and/or any other suitable property. The descriptive parameter can include: appearance (e.g., an appearance feature vector), geometry (e.g., a geometry feature vector), a set of attribute values for a property attribute (e.g., structural attribute, such as roof shape, roof facet count, roof pitch, etc.), and/or any other suitable parameter. The method can optionally align building segments (e.g., such that street-facing sides are oriented in the same direction) before calculating the descriptive parameter; extract descriptive parameters for a set of transformations, rotations, or poses (e.g., wherein preliminary similarity scores are determined for each transformation, rotation, or pose of the set, and the final similarity score is determined based on the most similar transformation, rotation, or pose); and/or otherwise manipulate the building segments before or after descriptive parameter extraction. The property attribute is preferably a structural attribute (e.g., for a primary structure, accessory structure, neighboring structure, etc.), but can additionally and/or alternatively be a condition-related attribute (e.g., roof condition, etc.), and/or any other suitable attribute. The attribute value for a property (e.g., reference property, neighboring property, etc.) can be determined using a model that ingests a measurement depicting the property and optionally auxiliary information (e.g., parcel data, text descriptors, etc.) and outputs an attribute value for the property; example shown in FIG. 7. The model can be tuned and/or adjusted for a use case or not be tuned and/or adjusted for a use case. The comparison metric can be: a loss function, a distance metric, a similarity metric (e.g., cosine similarity, Manhattan similarity, Mahalanobis similarity, etc.), a dissimilarity metric, and/or any other suitable metric. The threshold can be predetermined (e.g., hardcoded, retrieved from a database 120, etc.) or be dynamically determined. The threshold can be determined based on: a physical distance between properties, a number of properties in an adjacent or otherwise similar group (e.g., same entity, same developer, similar appearance cues, similar parcel, etc.), a geographic region, a climate, a property type, heuristics (e.g., to evaluate whether a set of influential features or attributes are similar), and/or otherwise determined. In a first example, physical distance between properties can have a direct relationship (e.g., the variables increase or decrease together) with the threshold. When the physical distance between two properties is short, the threshold is determined to be lower. In a second example, the number of properties in the group can have an inverse relationship with the threshold. When the number of properties in the group is large, the threshold is determined to be lower. However, the threshold can be otherwise determined.

In a fourth variant, S300 can include identifying other properties within the group using a classifier that classifies whether the property and a neighboring property are substantially similar to one another based on an analysis of a pair of measurements (e.g., measurement segments segmented by parcel, building segments, etc.), each depicting one of the property or the neighboring property.

In a fifth variant, S300 can include identifying other properties within the group based on parcels and/or building segments. In an example, if a building segment associated with the property has the same appearance and/or features as a building segment associated with an adjacent property, the property and adjacent property are determined to be part of the same group. In another example, if all building segments in contiguous parcels are similar (e.g., similar size, similar shape, similar appearance, etc.), the property and properties associated with the parcels are determined to be part of the same group; example shown in FIG. 5.

In a sixth variant, S300 can include identifying other properties within the group based on parcel information for parcels. In an example, given two parcels (a parcel associated with the property and a parcel associated with a different property), if a convexity of the boundary for the combined parcels is greater than a convexity of the boundary for each parcel independently, the properties associated with the parcels are determined to be part of the same group. In another example, parcel subgroups can be combined when the convexity of the combined parcel subgroups is greater than the convexity of each parcel subgroup independently.

However, other properties within the group can be otherwise determined.

5.4. Determining Whether to Merge Groups S400.

Determining whether to merge groups S400 functions to identify super-groups that span multiple parcels (e.g., multiple surrounding parcels). S400 is preferably performed after S300, but can additionally and/or alternatively be performed concurrently with S300, after the property is determined to be part of a group in S200, concurrently with S200, and/or performed at any other suitable time. S400 is preferably determined based on a comparison between groups, but can alternatively not be based on a comparison between groups. S400 is preferably performed based on the descriptive parameters of the groups and/or properties therein (e.g., appearance-based feature vectors, geometry-based feature vectors, attribute value for a property attribute, etc.), but can additionally or alternatively be otherwise determined.

In a first variant, groups can be merged when the summary descriptive parameters for each group are substantially similar (e.g., separated by less than a predetermined distance). The summary descriptive parameter can be: an average, a median, a mode, a standard deviation, a distribution, and/or any other suitable metric of the descriptive parameters of the properties within a set of groups.

In a first example, S400 includes calculating an average appearance feature vector for each candidate group, and merging the groups when the average appearance feature vectors are substantially similar (e.g., less than a threshold difference apart, less than a threshold distance apart, etc.).

Figure 8:
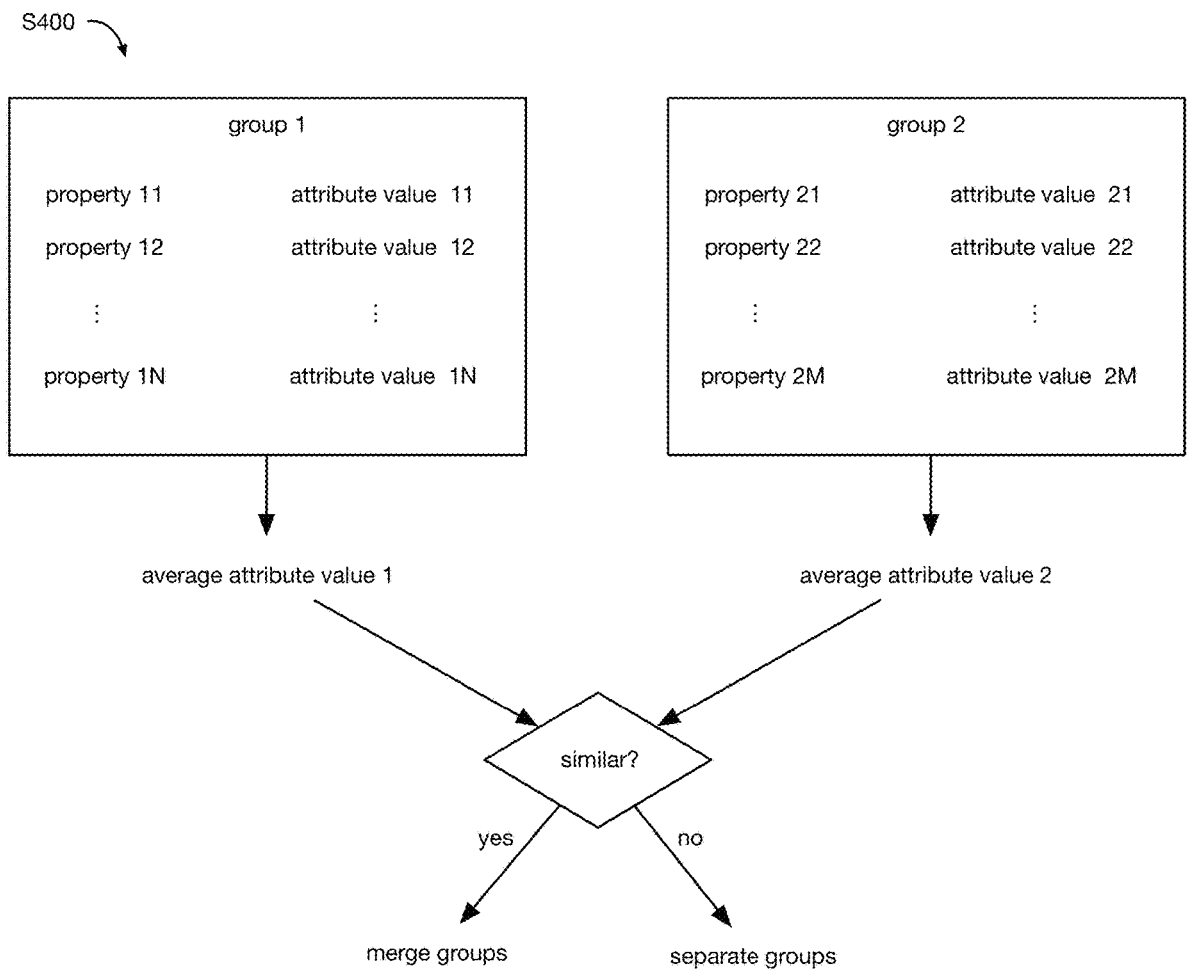
FIG. 8 is an illustrative example of determining whether to merge groups.

In a second example, S400 includes determining attribute values for each property within each group, and merging the groups when the average of attribute values (e.g., aggregated into an attribute vector) for the first and second groups are substantially similar (e.g., less than a threshold difference apart, less than a threshold distance apart, etc.); example shown in FIG. 8.

In a third example, S400 includes determining a distribution of attribute values for each group, determining a comparison metric (e.g., similarity score) based on the distribution (e.g., comparing shape, center, variability, outliers, etc.), and merging the groups when the comparison metric satisfies a set of conditions (e.g., the comparison metrics are the same, within a predetermined range of each other, etc.).

In a second variant, S400 can include comparing descriptive parameters (e.g., feature vector, attribute value for a property attribute, etc.) between each property of each group. For example, S400 includes: calculating an appearance feature vector and/or attribute value for each property from a first group, calculating an appearance feature vector and/or attribute value for each property from a second group, comparing the appearance feature and/or attribute value for each property from the first group to each property from the second group, and merging the groups when more than a threshold proportion of the properties from the first and second groups are similar (e.g., have a similarity score higher than a threshold, have distances less than a threshold, etc.).

In a third variant, whether to merge groups can be determined: manually, based on physical proximity, based on construction date, based on an entity (e.g., developer), and/or otherwise determined.

However, whether to merge groups can be otherwise determined.

5.5. Providing a Final Group S500.

Providing a final group S500 functions to provide a final group to an endpoint through an interface. S500 can be performed after S300, concurrently with S300, after S400, concurrently with S400, and/or at any other suitable time. The final group can be: one final group, multiple final groups, and/or any other suitable number of final groups. The final group can be: a group (and associated properties) determined after determining other properties (e.g., the property and other properties, determined in S300, etc.); a super-group (and associated properties) determined after merging groups (e.g., determined in S400); the property only; and/or any other suitable group. The endpoint can be: an endpoint on a network, a customer endpoint, a user endpoint, an automated valuation model system, a real estate valuation provider, a real estate listing service, an insurance system, an HOA system, a user interface, a report, and/or any other suitable endpoint. The interface can be on a mobile application, web application, desktop application, an API, and/or any other suitable interface executing on a user device, gateway, and/or any other computing system.

However, the final group can be otherwise provided.

6. Use Cases

The final group can be used in various applications. In a first example, the final group (and associated properties) can be used by real estate mortgage lenders (e.g., pricing-in all properties within a group during underwriting, identifying where to send inspectors within a group, determining when to reach out to adjust insurance policy for a group, etc.). In a second example, the final group (and associated properties) can be used to conduct risk analysis for property and/or liability insurance. In a third example, the final group (and associated properties) can be used to further conduct analysis (e.g., hazard risk estimation, change detection, typicality analysis, automated group and/or property valuation, viewshed analysis, curb appeal analysis, liquidity analysis, etc.) on the entire group. However, the final group can be otherwise used.

All or portions of the methods described above can be used for automated property valuation, for insurance purposes, and/or otherwise used. For example, any of the outputs discussed above (e.g., for the property) can be provided to an automated valuation model (AVM), which can predict a property value based on one or more of the attribute values (e.g., feature values), generated by the one or more models discussed above, and/or attribute value-associated information. The AVM can be: retrieved from a database 120, determined dynamically, and/or otherwise determined.

Different processes and/or elements discussed above can be performed and controlled by the same or different entities. In the latter variants, different subsystems can communicate via: APIs (e.g., using API requests and responses, API keys, etc.), requests, and/or other communication channels.

Alternative embodiments implement the above methods and/or processing modules in non-transitory computer-readable media, storing computer-readable instructions that, when executed by a processing system, cause the processing system to perform the method(s) discussed herein. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), contemporaneously (e.g., concurrently, in parallel, etc.), or in any other suitable order by and/or using one or more instances of the systems, elements, and/or entities described herein. Components and/or processes of the following system and/or method can be used with, in addition to, in lieu of, or otherwise integrated with all or a portion of the systems and/or methods disclosed in the applications mentioned above, each of which are incorporated in their entirety by this reference.

As a person skilled in the art will recognize from the previous detailed description and from the figures and claims, modifications and changes can be made to the preferred embodiments of the invention without departing from the scope of this invention defined in the following claims.

We claim:

1. A method, comprising, by a processing system:
   determining a classification model trained to predict a training parcel class for each of a set of training parcels associated with a set of training properties based on features extracted from parcel information for each of the set of training parcels, wherein the classification model is trained on the set of training parcels using qualitative labels;
   for each of a set of properties, each associated with adjacent parcels:
      determining a set of measurements depicting the property;
      extracting a building segment for the property from the set of measurements using a segmentation model comprising a neural network;
      determining a parcel associated with the property; and
      classifying the parcel with a parcel class using the classification model;
   determining whether each property of the set of properties is part of a group based on the respective parcel class and the respective building segment; and
   generating a final group comprising the properties of the set of properties that are determined to be part of the group.

2. The method of claim 1, wherein the parcel class is determined based on a relationship between the parcel and the building segment.

3. The method of claim 2, wherein the parcel is classified as a unit parcel when the parcel intersects less than a threshold proportion of the building segment associated with the property.

4. The method of claim 3, wherein a property is determined to be part of the group when a parcel class for a parcel associated with the property comprises a unit parcel.

5. The method of claim 1, wherein properties of the set of properties are determined to be part of the group when the respective parcels overlap a shared continuous building segment.

6. The method of claim 1, wherein properties of the set of properties are determined to be part of the group when the respective parcels fit within holes of a shared surrounding parcel.

7. The method of claim 1, wherein determining whether each property of the set of properties is part of the group comprises:
   determining a set of neighboring properties neighboring a property that is determined to be part of the group;
   determining a descriptive parameter for each neighboring property of the set of neighboring properties;
   determining a comparison metric between the descriptive parameter of each neighboring property and a descriptive parameter of the property; and
   determining that the neighboring property is part of the group when the comparison metric satisfies a threshold.

8. The method of claim 7, wherein the descriptive parameter comprises a feature vector extracted from the set of measurements based on the building segment.

9. The method of claim 1, wherein the final group is generated by merging the group with a second group based on a comparison between a first value for a summary descriptive parameter for the group and a second value for the summary descriptive parameter for the second group.

10. The method of claim 9, further comprising determining a first set of attribute values for the first group and a second set of attribute values for the second group, using an attribute model, wherein the respective summary descriptive parameters comprise an average of respective attribute values.

11. A system, comprising:
a processing system, configured to:
determine a classification model trained to predict a training parcel class for each of a set of training parcels associated with a set of training properties based on features extracted from parcel information for each of the set of training parcels, wherein the classification model is trained on the set of training parcels using qualitative labels;
determine a set of measurements depicting each of a set of properties;
extract a building segment for each property of the set of properties from the set of measurements using a segmentation model comprising a neural network;
determine a parcel associated with each property of the set of properties;
classify the parcel for each property of the set of properties with a parcel class using the classification model;
determine whether each property of the set of properties is part of a group based on the respective building segments and the respective parcel classes; and
determine a final group comprising the properties of the set of properties that are determined to be part of the group.

12. The system of claim 11, wherein a property of the set of properties is determined to be part of the group based on a relationship between the respective parcel and the respective building segment.

13. The system of claim 12, wherein a property of the set of properties is determined to not be part of the group when the respective parcel fully encompasses the respective building segment associated with the property.

14. The system of claim 12, wherein a property of the set of properties is determined to be part of the group when the respective parcel is part of a plurality of parcels intersecting a continuous building segment.

15. The system of claim 11, wherein a property of the set of properties is determined to be part of the group when a parcel associated with the property falls within a hole of a surrounding parcel.

16. The system of claim 11, wherein a property of the set of properties is determined to be part of the group when a set of descriptive parameters for the property are substantially similar to descriptive parameter sets of other properties within the group.

17. The system of claim 11, wherein determining the set of other properties within the group comprises:
determining a set of neighboring properties neighboring a property that is determined to be part of the group;
determining a descriptive parameter for each neighboring property of the set of neighboring properties;
determining a similarity metric between the descriptive parameter of each neighboring property and a descriptive parameter of the property; and
determining that the neighboring property is part of the group when the similarity metric falls below a threshold.

18. The system of claim 11, wherein the set of measurements comprises aerial imagery.

19. The system of claim 11, wherein the final group is generated by merging the group with a second group based on a similarity between a first summary descriptive parameter for the group and a second summary descriptive parameter for the second group.

20. The system of claim 19, wherein the descriptive parameter comprises a feature vector.

21. The system of claim 11, wherein whether each property of the set of properties is part of a group is further determined based on parcel information for a combination of multiple parcels.

22. The system of claim 11, wherein the parcel class comprises at least one of a unit parcel, a surrounding parcel, or a stand-alone parcel.

* * * * *